(12) United States Patent
Jeong et al.

(10) Patent No.: US 12,145,664 B2
(45) Date of Patent: Nov. 19, 2024

(54) STEERING APPARATUS FOR VEHICLE

(71) Applicant: HL MANDO CORPORATION, Gyeonggi-do (KR)

(72) Inventors: Min Woo Jeong, Gyeonggi-do (KR); Joo Namgung, Gyeonggi-do (KR); InHwan Lee, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 352 days.

(21) Appl. No.: 16/547,531

(22) Filed: Aug. 21, 2019

(65) Prior Publication Data

US 2020/0062299 A1   Feb. 27, 2020

(30) Foreign Application Priority Data

Aug. 23, 2018   (KR) .................. 10-2018-0098477

(51) Int. Cl.
*B62D 5/04* (2006.01)
*B62D 3/12* (2006.01)
(Continued)

(52) U.S. Cl.
CPC .............. *B62D 5/0484* (2013.01); *B62D 3/12* (2013.01); *B62D 5/0424* (2013.01); *B62D 5/046* (2013.01); *B62D 6/10* (2013.01); *B62D 15/021* (2013.01)

(58) Field of Classification Search
USPC .......................................................... 701/43
See application file for complete search history.

(56) References Cited

U.S. PATENT DOCUMENTS

2011/0057510 A1\* 3/2011 Yamashita ............... B62D 6/02
307/10.1
2011/0203869 A1   8/2011 Tanaka et al.
(Continued)

FOREIGN PATENT DOCUMENTS

CN   101918264   12/2010
CN   104682817   6/2015
(Continued)

OTHER PUBLICATIONS

Notice of Allowance dated Dec. 16, 2019 for Korean Application No. 10-2018-0098477 and its English machine translation by Google Translate.
(Continued)

*Primary Examiner* — Jonathan M Dager
*Assistant Examiner* — Laura E Linhardt
(74) *Attorney, Agent, or Firm* — Womble Bond Dickinson (US) LLP

(57) ABSTRACT

Embodiments relate to a steering apparatus for a vehicle. A steering apparatus for a vehicle includes: a first steering controller and a second steering controller that control a steering motor; and a power supply that forms a first output power source and a second output power source based on at least one of a first input power source or a second input power source through control of a power supply path, wherein, in a case in which operation states of the first steering controller and the second steering controller are normal, the power supply forms a first output power source using the first input power source through control of the power supply path, and the first steering controller controls the steering motor based on the first output power source.

20 Claims, 24 Drawing Sheets

(51) Int. Cl.
   *B62D 5/00*      (2006.01)
   *G06F 1/12*      (2006.01)
   *H02J 7/00*      (2006.01)
   *H02J 9/06*      (2006.01)
   *H02P 25/22*     (2006.01)
   *H02P 27/06*     (2006.01)
   *H02P 29/028*    (2016.01)
   *B62D 6/10*      (2006.01)
   *B62D 15/02*     (2006.01)

(56) References Cited

U.S. PATENT DOCUMENTS

| | | | |
|---|---|---|---|
| 2015/0145448 A1 | 5/2015 | Mukai et al. | |
| 2016/0036371 A1 | 2/2016 | Yamasaki | |
| 2016/0332660 A1 | 11/2016 | Sasaki et al. | |
| 2017/0029014 A1 | 2/2017 | Yamamoto | |
| 2019/0144029 A1* | 5/2019 | Taki | H02P 27/06 |
| | | | 318/3 |
| 2019/0252909 A1* | 8/2019 | Sugiyama | H02J 7/0068 |
| 2019/0363664 A1 | 11/2019 | Nakamura | |
| 2020/0023888 A1* | 1/2020 | Horitake | H02J 7/34 |
| 2020/0247462 A1* | 8/2020 | Akutsu | H02P 29/028 |

FOREIGN PATENT DOCUMENTS

| | | |
|---|---|---|
| CN | 105313952 | 2/2016 |
| CN | 106061796 | 10/2016 |
| CN | 106394652 | 2/2017 |
| CN | 106828132 | 6/2017 |
| JP | 2004-80939 | 3/2004 |
| JP | 2004-276833 | 10/2004 |
| JP | 2004276833 A * | 10/2004 |
| JP | 2005-104439 | 4/2005 |
| JP | 2007-326379 | 12/2007 |
| JP | 2013-71550 | 4/2013 |
| JP | 2015-81013 | 4/2015 |
| JP | 2016-1953 | 1/2016 |
| JP | 2018-129996 | 8/2018 |
| KR | 10-0693965 | 3/2007 |
| KR | 10-2018-0074679 | 7/2018 |

OTHER PUBLICATIONS

Office Action issued for Korean Patent Application No. 10-2018-0098477 dated Aug. 12, 2019 and its English machine translation by Google Translate.

Notice of Allowance dated Jul. 24, 2023 for Chinese Patent Application No. 201910783800.8 and its English machine translation from Google Translate.

Office Action dated Jan. 11, 2023 for Chinese Patent Application No. 201910783800.8 and its English machine translation by Google Translate.

* cited by examiner

FIG.10

| IGN | OFF | ON | | ON | ON | OFF |
|---|---|---|---|---|---|---|
| EngineRPM | Stop | Stop | | Run | Stop | Stop |
| Master ECU | ECU_OFF | INIT | SELF_TEST | INIT_COMPLETE | PASSIVE | ASSIST_ACTIVE(Master) | PASSIVE | ECU_OFF |
| Backup ECU | ECU_OFF | INIT | SELF_TEST | INIT_COMPLETE | PASSIVE | ASSIST_STANDBY | PASSIVE | ECU_OFF | time →

STEERING APPARATUS FOR VEHICLE

CROSS-REFERENCE TO RELATED APPLICATION

This application claims priority from Korean Patent Application No. 10-2018-0098477, filed on Aug. 23, 2018, which is hereby incorporated by reference for all purposes as if fully set forth herein.

BACKGROUND OF THE INVENTION

Field of the Invention

Embodiments relate to a steering system and, more particularly, to a steering apparatus for a vehicle.

Description of Related Art

Generally, a steering system represents a system that can change a steering angle of vehicle wheels based on a steering force (or a rotating force) applied to a steering wheel by a driver of a vehicle. Recently, in order to secure stability of a steering state by reducing a steering force of a steering wheel, an electric power steer (EPS), in other words, a motor-driven power steering system is applied to vehicles.

Such a motor-driven power steering system can provide an optimal steering state by driving a motor in accordance with a speed state and a torque state of a vehicle such that a light and easy sense of steering is provided for a driver of a vehicle at the time of operating at a low speed, a heavy and secured sense of steering is provided for a driver of the vehicle at the time of operating at a high speed, and rapid steering is performed for a driver of the vehicle at the time of emergency.

Particularly, higher redundancy and higher reliability have recently been requested for steering apparatuses for vehicles.

SUMMARY OF THE INVENTION

An object of these embodiments is to provide a steering apparatus and a steering method for vehicles capable of improving redundancy and reliability.

In order to achieve the objects described above, according to one aspect of these embodiments, there is provided a steering apparatus for a vehicle including: a first steering controller and a second steering controller that control a steering motor; and a power supply that forms a first output power source and a second output power source based on at least one of a first input power source or a second input power source through control of a power supply path, wherein, in a case in which operation states of the first steering controller and the second steering controller are normal, the power supply forms a first output power source using the first input power source through control of the power supply path, and the first steering controller controls the steering motor based on the first output power source.

In addition, in order to achieve the objects described above, according to another aspect of these embodiments, there is provided a steering apparatus for a vehicle including: a first steering controller and a second steering controller that control a steering motor; and a power supply that forms a first output power source and a second output power source based on at least one of a first input power source or a second input power source through control of a power supply path, wherein, in a case in which an operation state of the first steering controller is abnormal, and an operation state of the second steering controller is normal, the power supply forms a second output power source based on the first input power source and the second input power source through control of the power supply path, and the second steering controller controls the steering motor based on the second output power source.

According to the steering apparatuses for vehicles according to these embodiments described above, there is an effect of improving redundancy and reliability of the vehicles.

BRIEF DESCRIPTION OF THE DRAWINGS

FIG. 10 is a diagram illustrating a normal operation state of a steering apparatus for a vehicle according to these embodiments.

DETAILED DESCRIPTION OF THE INVENTION

Figure 1:
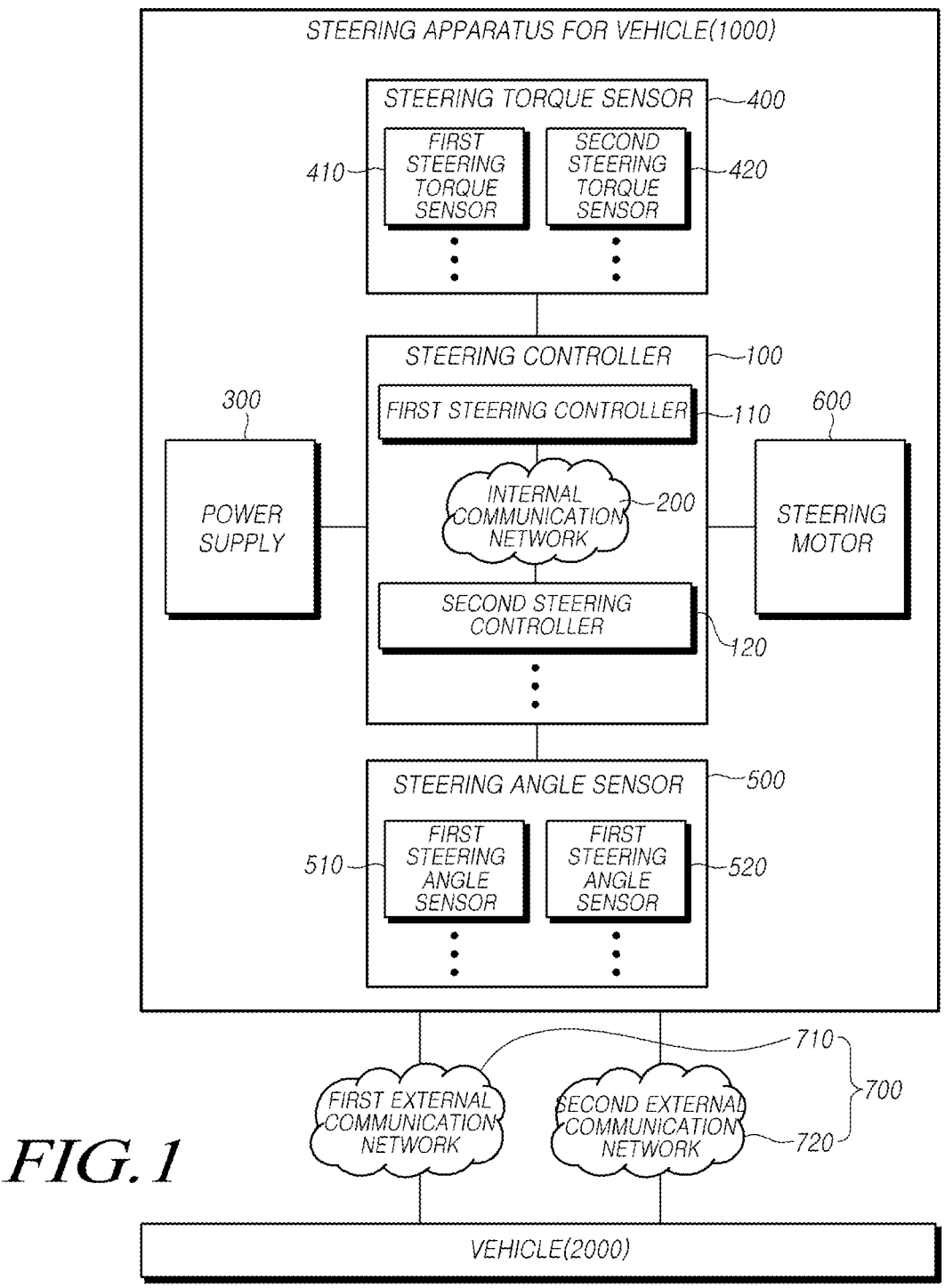
FIG. 1 is a whole block configuration diagram illustrating a steering apparatus for a vehicle according to these embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Although "first", "second", and the like are used for describing various elements, constituent elements, and/or sections, the elements, the constituent elements and/or the sections are not limited thereto. These terms are used only for distinguishing one element, one constituent element, one section, or the like from other elements, constituent elements, sections, or the like. Thus, it is apparent that a first element, a first constituent element, or a first section described below may be a second element, a second constituent element, or a second section within the technical ideas of these embodiments.

Terms used here are used for describing embodiments but are not for limiting these embodiments. In description here, a singular form includes a plural form unless otherwise mentioned. "Comprises" and/or "comprising" used here in describing a constituent element, a step, an operation and/or an element do not exclude presence or addition of one or more other constituent elements, steps, operations and/or elements.

Unless otherwise defined, all the terms (including technical and scientific terms) used here are used for meanings that can be commonly understood by a person skilled in a technical field to which there embodiments belong. In addition, terms that are generally used but are not defined in dictionaries are not to be interpreted ideally or excessively unless clearly defined particularly.

In describing these embodiments, in a case in which it is judged that detailed description of a known function or component may unnecessarily disturb the gist of these embodiments, the detailed description will be omitted. Terms described below are terms defined in consideration of functions of these embodiments and may be different in accordance with intentions, practices, and the like of a user or an operator. Accordingly, the definitions thereof need to be set based on details over the entire specification.

Hereinafter, a steering apparatus for a vehicle according to these embodiments will be described with reference to the attached drawings.

FIG. 1 is a whole block configuration diagram illustrating a steering apparatus for a vehicle according to these embodiments.

Referring to FIG. 1, a steering apparatus 1000 for a vehicle according to these embodiments may be formed to include a steering controller 100, an internal communication network 200, and the like.

The steering controller 100 is connected to a steering motor 600 and may control the steering motor 600. A plurality of steering controllers 100 may be provided. In such a case, each of the steering controllers 110 and 120 may control the steering motor 600. For example, each of the steering controllers 110 and 120 may control one steering motor 600. In other words, the control functions of the steering controllers 110 and 120 may be configured to be the same. The steering controllers 110 and 120 of which the control functions are the same may control one steering motor 600 at different time points.

The steering controllers 110 and 120 may be connected to each other through the internal communication network 200. Here, the internal communication network 200 represents a private communication network only for steering controllers that can connect only the steering controllers 110 and 120 and may be either a wired communication network such as a CAN communication network or a radio communication network.

In a case in which the operation state of a steering controller that currently controls the steering motor 600 is abnormal, each of the steering controllers 110 and 120 can monitor operation states of the others using the internal communication network 200 such that the steering motor 600 is controlled through at least one steering controller among the remaining steering controllers. Alternatively, the steering controllers 110 and 120 can determine a control right for the steering motor 600 in accordance with a result of the monitoring.

As one example, in a case in which an operation state of a steering controller that currently controls the steering motor 600 out of the steering controllers 110 and 120 is abnormal as a result of the monitoring, the steering controllers 110 and 120 may move a control right for the steering motor 600 from the steering controller currently controlling the steering motor 600 to at least one steering controller among the remaining steering controllers that operate normally.

As another example, in a case in which an operation state of a steering controller that currently controls the steering motor 600 out of the steering controllers 110 and 120 is normal as a result of the monitoring, the steering controllers 110 and 120 may cause a control right for the steering motor 600 to be continuously held by the steering controller that currently controls the steering motor 600.

As described above, in a steering apparatus for a vehicle according to these embodiments, steering controllers are connected to each other through an internal communication network and monitor mutual operation states using the internal communication network such that, in a case in which an operation state of a steering controller that currently controls the steering motor is abnormal through each steering controller, the steering motor is controlled through at least one steering controller among the remaining steering controllers. Accordingly, even in a situation in which a current steering controller malfunctions, a control right can be moved to any other steering controller performing a backup function, and assistance can be performed without the steering performance of the vehicle decreased or lost, and the redundancy and the reliability of the vehicle can be improved through this.

As described above, although two steering controllers 100 according to these embodiments may be configured, the number of the steering controllers is not limited thereto, and three or more steering controllers may be configured. Particularly, one among a plurality of steering controllers may represent a primary steering controller, and the remaining steering controllers may represent sub steering controllers or redundant steering controllers.

Hereinafter, a steering apparatus 1000 for a vehicle according to these embodiments in a case in which there are two steering controllers 100 will be described for the simplicity of description. Referring back to FIG. 1, the steering controllers 110 and 120 may include a first steering controller 110 and a second steering controller 120. Here, the first steering controller 110 may represent a primary steering controller that can drive the steering motor 600 with top priority. In addition, the second steering controller 120 may represent a sub steering controller or a redundant steering controller that can drive the steering motor 600 instead of the first steering controller 110.

The second steering controller 120 may monitor the operation state of the first steering controller 110 through an internal communication network 200 such that, in a case in which the operation state of the first steering controller 110 that currently controls the steering motor 600 is abnormal, the steering motor 600 is controlled through the second steering controller 120 instead of the first steering controller 110.

As one example, in a case in which the operation state of the first steering controller 110 that currently controls the steering motor 600 is abnormal as a result of the monitoring, the second steering controller 120 may move a control right for the steering motor 600 from the steering controller 110 to the second steering controller 120.

As another example, in a case in which the operation state of the first steering controller 110 that currently controls the steering motor 600 is normal as a result of the monitoring, the second steering controller 120 may cause a control right for the steering motor 600 to be continuously held by the first steering controller.

On the other hand, in a case in which the operation state of the first steering controller 110 is abnormal, and the operation state of the second steering controller 120 becomes abnormal, the steering wheel operation may be switched to a manual mode or a reduced assist mode. As one example, in a case in which the operation state of the first steering controller 110 is abnormal, and the operation state of the second steering controller 120 becomes abnormal, the second steering controller 120 may switch the steering wheel operation to a manual mode or a reduced assist mode. As another example, in a case in which the operation state of the first steering controller 110 is abnormal, and the operation state of the second steering controller 120 becomes abnormal, the vehicle may switch the steering wheel operation to a manual mode or a reduced assist mode.

Meanwhile, the first steering controller 110 and the second steering controller 120 may be redundantly configured to be the same. In other words, the first steering controller 110 and the second steering controller 120 may include the same constituent elements.

As described above, in the steering apparatus for a vehicle according to these embodiments, not only the first steering controller and the second steering controller but also steering torque sensors, steering angle sensors, and motor position sensors are redundantly configured to be the same, and accordingly, one steering motor can be controlled by redundantly configuring a steering control function except for the steering motor in one package instead of two separate independent packages, whereby the redundancy and the reliability of the vehicle can be improved.

Referring back to FIG. 1, the steering apparatus 1000 for a vehicle according to these embodiments may include a power supply 300.

The power supply 300 is connected to the steering controller 100 and can supply electric energy to the steering controller 100. For example, the power supply 300 may supply a DC voltage to the steering controller 100. Particularly, the power supply 300 may supply two DC voltages to the steering controller 100.

Here, two DC voltages may include a first DC voltage and a second DC voltage. The first DC voltage may be supplied to the first steering controller 110 and may represent a primary DC voltage. The second DC voltage may be supplied to the second steering controller 120 and may represent a sub DC voltage or a redundant DC voltage.

The operation of the power supply 300 may be controller and monitored by each of the steering controllers 110 and 120. Each of the steering controllers 110 and 120 may monitor an operation state of the power supply 300 and a state of the supplied DC voltage and determine a control right for the steering motor 600 in accordance with a result of the monitoring.

For example, the second steering controller 120 may monitor the operation state of the first steering controller 110 through the internal communication network 200. In addition, the second steering controller 120 may determine a control right for the steering motor 600 in accordance with a result of the monitoring. Here, by monitoring the operation state of the first steering controller 110, the second steering controller 120 may monitor the operation state of the power supply 300 and the state of the supplied DC voltage.

As one example, in a case in which the first DC voltage supplied from the power supply 300 to the first steering controller 110 is abnormal as a result of the monitoring, the second steering controller 120 may move a control right for the steering motor 600 from the steering controller 110 to the second steering controller 120.

As another example, in a case in which the first DC voltage supplied from the power supply 300 to the first steering controller 110 is normal as a result of the monitoring, the second steering controller 120 may cause a control right for the steering motor 600 to be continuously held by the first steering controller 110.

Referring back to FIG. 1, the steering apparatus 1000 for a vehicle according to these embodiments may include a steering torque sensor 400.

The steering torque sensor 400 may include a plurality of torque sensors. For example, the steering torque sensor 400 may include at least one first steering torque sensor 410 and at least one second steering torque sensor 420.

At least one first steering torque sensor 410 and at least one second steering torque sensor 420 may measure a torque of the steering wheel. In addition, at least one first steering torque sensor 410 and at least one second steering torque sensor 420 may generate torque information of the steering wheel based on the measured torque of the steering wheel.

At least one first steering torque sensor 410 may be connected to the first steering controller 110. In addition, at least one first steering torque sensor 410 may provide the torque information of the steering wheel for the first steering controller 110. Here, the first steering torque sensor 410 may provide the torque information of the steering wheel for the first steering controller 110 and thus may represent a primary steering torque sensor.

At least one second steering torque sensor 420 may be connected to the second steering controller 120. In addition, at least one second steering torque sensor 420 may provide the torque information of the steering wheel for the second steering controller 120. Here, the second steering torque sensor 420 may provide the torque information of the steering wheel for the second steering controller 120 and thus may represent a sub steering torque sensor or a redundant steering torque sensor.

The operation of the steering torque sensor 400 may be controlled and monitored by each of the steering controllers 110 and 120. Each of the steering controllers 110 and 120 may monitor the operation state of the steering torque sensor 400 and the provided torque information of the steering wheel and determine a control right for the steering motor 600 in accordance with a result of the monitoring.

For example, the second steering controller 120 may monitor the operation state of the first steering controller 110 through the internal communication network 200. In addition, the second steering controller 120 may determine a control right for the steering motor 600 in accordance with a result of the monitoring. Here, by monitoring the operation state of the first steering controller 110, the second steering controller 120 may monitor the operation state of at least one first steering torque sensor 410 and the provided torque information of the steering wheel.

As one example, in a case in which torque information of the steering wheel provided from at least one first steering torque sensor 410 for the first steering controller 110 is abnormal as a result of the monitoring, the second steering controller 120 may move a control right for the steering motor 600 from the first steering controller 110 to the second steering controller.

As another example, in a case in which torque information of the steering wheel provided from at least one first steering torque sensor 410 for the first steering controller 110 is normal as a result of the monitoring, the second steering controller 120 may cause the control right for the steering motor 600 to be continuously held by the first steering controller.

Meanwhile each of the first steering controller 110 and the second steering controller 120 according to these embodiments may include an electronic control unit (ECU) but is not limited thereto and may include any type of control device (or a system) as long as the device (or the system) can be electronically controlled.

Referring back to FIG. 1, the steering apparatus 1000 for a vehicle according to these embodiments may include a steering angle sensor 500.

The steering angle sensor 500 may include a plurality of steering angle sensors. For example, the steering angle sensor 500 may include at least one first steering angle sensor 510 and at least one second steering angle sensor 520.

At least one first steering angle sensor 510 and at least one second steering angle sensor 520 may measure a steering angle of the steering wheel. At least one first steering angle sensor 510 may be connected to the first steering controller 110. In addition, at least one first steering angle sensor 510 may provide steering angle information of the steering wheel for the first steering controller 110. Here, the first steering angle sensor 510 may provide steering angle information of the steering wheel for the first steering controller 110 and thus may represent a primary steering angle sensor.

At least one second steering angle sensor 520 may be connected to the second steering controller 120. In addition, at least one second steering angle sensor 520 may provide steering angle information of the steering wheel for the second steering controller 120. Here, the second steering angle sensor 520 may provide steering angle information of the steering wheel for the second steering controller 120 and thus may represent a sub steering angle sensor or a redundant steering angle sensor.

The operation of the steering angle sensor 500 may be controlled and monitored by each of the steering controllers 110 and 120. Each of the steering controllers 110 and 120 may monitor the operation state of the steering angle sensor 500 and provided steering angle information of the steering wheel and determine a control right for the steering motor 600 in accordance with a result of the monitoring.

For example, the second steering controller 120 may monitor the operation state of the first steering controller 110 through the internal communication network 200. In addition, the second steering controller 120 may determine a control right for the steering motor 600 in accordance with a result of the monitoring. Here, by monitoring the operation state of the first steering controller 110, the second steering controller 120 may monitor the operation state of at least one first steering angle sensor 510 and provided steering angle information of the steering wheel.

As one example, in a case in which the steering angle information of the steering wheel provided from at least one first steering angle sensor 510 for the first steering controller 110 is abnormal as a result of the monitoring, the second steering controller 120 may move a control right for the steering motor 600 from the first steering controller 110 to the second steering controller.

As another example, in a case in which the steering angle information of the steering wheel provided from at least one first steering angle sensor 510 for the first steering controller 110 is normal as a result of the monitoring, the second steering controller 120 may cause a control right for the steering motor 600 to be continuously held by the first steering controller 110.

Referring back to FIG. 1, the steering apparatus 1000 for a vehicle according to these embodiments may include the steering motor 600.

The steering motor 600 may be connected to each of the steering controllers 110 and 120. In addition, the operation of the steering motor 600 may be controlled by each of the steering controllers 110 and 120. For example, the operation of the steering motor 600 may be controlled by the first steering controller 110. In a case in which the operation state of the first steering controller 110 is abnormal, the operation of the steering motor 600 may be controlled by the second steering controller 120 instead of the first steering controller 110.

The steering motor 600 may include a motor of a single winding type but is not limited thereto and may include any type of motor as long as it can be controlled through each steering controller.

Referring back to FIG. 1, the steering apparatus 1000 for a vehicle according to these embodiments may include an external communication network 700.

The external communication network 700 may include a plurality of external communication networks. For example, the external communication network 700 may include a first external communication network 710 and a second external communication network 720. The first external communication network 710 may connect the first steering controller 110 and a vehicle 2000 to each other. In addition, the first external communication network 710 may provide state information of the vehicle provided from the vehicle 2000 for the first steering controller 110. Here, the first external communication network 710 may provide the state information of the vehicle provided from the vehicle 2000 for the first steering controller 110 and thus may represent a primary external communication network.

The second external communication network 720 may connect the second steering controller 120 and the vehicle 2000 to each other. In addition, the second external communication network 720 may provide state information of the vehicle provided from the vehicle 2000 for the second steering controller 120. Here, the second external communication network 720 may provide the state information of the vehicle provided from the vehicle 2000 for the second steering controller 120 and thus may represent a sub external communication network or a redundant external communication network.

An operation of the external communication network 700 may be controlled and monitored by each of the steering controller 110 and 120. Each of the steering controllers 110 and 120 may monitor the operation state of the external communication network 700 and the state information of the vehicle provided from the vehicle 2000 through the external communication network 700 and determine a control right for the steering motor 600 in accordance with a result of the monitoring.

For example, the second steering controller 120 may monitor the operation state of the first steering controller 110 through the internal communication network 200. In addition, the second steering controller 120 may determine a control right for the steering motor 600 in accordance with the result of the monitoring. Here, by monitoring the operation state of the first steering controller 110, the second steering controller 120 may monitor the operation state of the first external communication network 710 and the state information of the vehicle provided from the vehicle 2000 through the first external communication network 710.

As one example, in a case in which the state information of the vehicle provided from the vehicle 2000 through the first external communication network 710 is abnormal as a result of the monitoring, the second steering controller 120 may move a control right for the steering motor 600 from the first steering controller 110 to the second steering controller.

As another example, in a case in which the state information of the vehicle provided from the vehicle 2000 through the first external communication network 710 is normal as a result of the monitoring, the second steering controller 120 may cause the control right for the steering motor 600 to be continuously held by the first steering controller 110.

Here, the state information of the vehicle may include at least one piece of information among vehicle speed information of the vehicle, torque information of the vehicle, steering angle information of the vehicle, yaw angle information of the vehicle, pedal information of the vehicle, and engine output information representing the state of the vehicle but is not limited thereto and may include any kind of information as long as the information is information that can represent the state of the vehicle.

The state information of the vehicle may include at least one piece of information among surrounding illuminance information of the vehicle, surrounding rainfall information of the vehicle, and surrounding snowfall information of the vehicle representing internal/external surrounding environments of the vehicle but is not limited thereto and may include any kind of information as long as the information is information that can represent internal/external surrounding environments of the vehicle.

Figure 2:
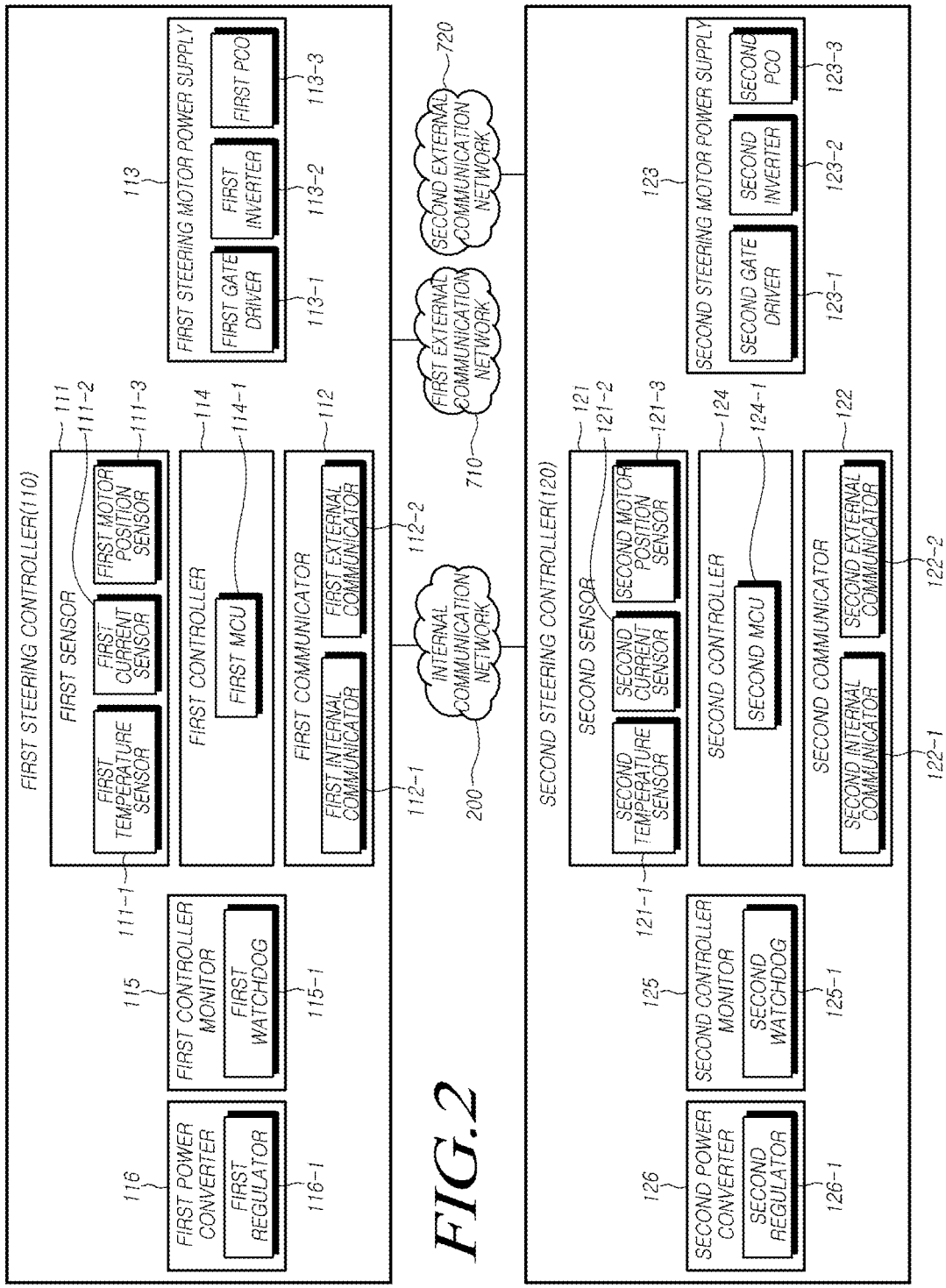
FIG. 2 is a specific block configuration diagram illustrating a steering controller according to these embodiments.

FIG. 2 is a specific block configuration diagram illustrating a steering controller according to these embodiments.

Referring to FIG. 2, the steering controller 100 according to these embodiments may include a first steering controller 110 and a second steering controller 120. Here, the first steering controller 110 may be formed to include a first sensor 111, a first communicator 112, a first steering motor power supply 113, a first controller 114, a first controller monitor 115, a first power converter 116, and the like.

The second steering controller 120 may be formed to include a second sensor 121, a second communicator 122, a second steering motor power supply 123, a second controller 124, a second controller monitor 125, a second power converter 126, and the like.

Particularly, the first sensor 111, the first communicator 112, the first steering motor power supply 113, the first controller 114, the first controller monitor 115, and the first power converter 116 of the first steering controller 110 and the second sensor 121, the second communicator 122, the second steering motor power supply 123, the second controller 124, the second controller monitor 125, and the second power converter 126 of the second steering controller 120 respectively perform the same functions, and thus, hereinafter, only the constituent elements of the first steering controller 110 will be described for the simplicity of description.

The first sensor 111 may be formed to include a first temperature sensor 111-1, a first current sensor 111-2, a first motor position sensor 111-3, and the like but is not limited thereto and may include any type of sensor as long as the sensor can measure a state of the steering apparatus for the vehicle.

The first temperature sensor 111-1 may acquire first temperature information by measuring the temperature of the first steering controller 110. The first temperature sensor 111-1 is connected to the first controller 114 and may provide the first temperature information for the first controller 114.

The first current sensor 111-2 may acquire first assist current information by measuring a first assist current between the first steering motor power supply 113 and the steering motor 600. The first current sensor 111-2 is connected to the first controller 114 and may provide the first assist current information for the first controller 114.

The first motor position sensor 111-3 may acquire first motor position information by measuring a position of the steering motor 600. The first motor position sensor 111-3 is connected to the first controller 114 and may provide the acquired first motor position information for the first controller 114.

The first communicator 112 may be formed to include a first internal communicator 112-1, a first external communicator 112-2, and the like. The first internal communicator 112-1 and a second internal communicator 122-1 are connected to each other through the internal communication network 200 and may transmit and receive information of the first steering controller 110 and the second steering controller 120.

In addition, the first internal communicator 112-1 may be connected to the first controller 114. In other words, the first internal communicator 112-1 may provide information (for example, the operation state information of the second steering controller (120) and the like) provided from the second steering controller 120 through the internal communication network 200 for the first controller 114. Then, the first internal communicator 112-1 may provide information (for example, the operation state information of the first steering controller 110 and the like) provided from the first controller 114 for the second internal communicator 122-1 through the internal communication network 200.

The first external communicator 112-2 may be connected to the vehicle 2000 through the first external communication network 710. In other words, the first external communicator 112-2 and the vehicle 2000 are connected to each other through the first external communication network 710 and may transmit and receive information of the first steering controller 110 and the vehicle. For example, the first external communicator 112-2 may provide information (for example, the state information of the vehicle and the like) provided from the vehicle 2000 through the first external communication network 710 for the first controller 114. Then, the first external communicator 112-2 may provide information (for example, the operation state information of the first steering controller 110 and the like) provided from the first controller 114 for the vehicle 2000 through the first external communication network 710.

Here, each of the first internal communicator 112-1 and the second external communicator 112-2 may include at least one communicator among wired and wireless communicators. The first steering motor power supply 113 may be formed to include a first gate driver 113-1, a first inverter 113-2, a first phase disconnector (PCO) 113-3, and the like.

The first gate driver 113-1 may be connected to the first controller 114. The first gate driver 113-1 may be provided with a first gate signal from the first controller 114. In addition, the first gate driver 113-1 may be connected to the first inverter 113-2. The first gate driver 113-1 may provide the first gate signal provided from the first controller 114 for the first inverter 113-2.

The first inverter 113-2 may be connected to a voltage supply 300. The first inverter 113-2 may be provided with a first DC voltage from the voltage supply 300. In addition, the first inverter 113-2 may be connected to the first gate driver 113-1. The first inverter 113-2 may be provided with the first gate signal from the first gate driver 113-1.

The first inverter 113-2 is a DC-AC converter and may generate a first assist current by performing voltage modulation of the first DC voltage provided from the voltage supply 300 in accordance with the first gate signal provided from the first gate driver 113-1.

The first inverter 113-2 may include a third-phase inverter but is not limited thereto and may be changed in accordance with a steering motor and a power supply.

The first phase disconnector (PCO) 113-3 may be connected to the first inverter 113-2. The first phase disconnector 113-3 may be provided with a first assist current from the first inverter 113-2.

The first phase disconnector 113-3 may supply or block the first assist current provided from the first inverter 113-2. In other words, the first phase disconnector 113-3 may be connected to the steering motor 600. The first phase disconnector 113-3 may supply the first assist current provided from the first inverter 113-2 to the steering motor 600 or block the first assist current.

Here, the phase disconnector is an element or a circuit that can cut off a phase and may include at least one of a switch, a circuit breaker, a disconnector, or a switching device but is not limited thereto and may include any kind of element or circuit as long as it can cut off the phase.

As described above, the steering apparatus for a vehicle according to these embodiments shares one steering motor through phase disconnectors and thus can separate each inverter through the phase disconnectors, and the redundancy and the reliability of the vehicle can be improved.

The first controller 114 is connected to the first sensor 111, the first communicator 112, the first steering motor power supply 113, the first controller monitor 115, and the first power converter 116 and may control the operation of each unit.

For example, the first controller 114 may generate a first gate signal based on the torque information of the steering wheel provided from at least one first steering torque sensor 410, the steering angle information of the steering wheel provided from at least one first steering angle sensor 510, the first temperature information provided from the first sensor 111, the first assist current information and the first motor position information, and the state information of the vehicle (for example, the vehicle speed information of the vehicle) provided from the first communicator 112 and control the first assist current of the first inverter 113-2 by providing the generated first gate signal for the first gate driver 113-1.

Here, the first gate signal may be generated using a modulation scheme set in advance. Particularly, the modulation scheme set in advance may include at least one voltage modulation scheme among a pulse width modulation scheme, an optical voltage modulation scheme, a triangular comparison voltage modulation scheme, and a space vector voltage modulation scheme, but is not limited thereto and may include any type of scheme as long as the scheme can generate a gate signal that can control the operation of the inverter.

The first controller 114 may include a first microcontroller 114-1 but is not limited thereto and may include any type of device (or computer) that can process (or perform execution and an arithmetic operation of) a program.

The first controller monitor 115 is connected to the first controller 114 and may monitor an operation state of the first controller 114. For example, the first controller 114 may provide a first watchdog signal for the first controller monitor 115. Then, the first controller monitor 115 may be cleared or generate a first reset signal based on the first watchdog signal provided from the first controller 114. In a case in which the first controller monitor 115 is cleared, it may represent that the first controller 114 is normally operating. In a case in which the first controller monitor 115 generates a first reset signal and provides the generated first reset signal for the first controller 114, it may represent that the first controller 114 is abnormally operating and may be reset in accordance with the first reset signal.

Here, the first watchdog signal may be a signal used for the first controller monitor 115 to periodically monitor the operation of the first controller 114 (for example, a signal disabling reset). In other words, the first watchdog signal may be a signal used for checking that a program that is currently executed by the first controller 114 is alive.

The first controller monitor 115 may include a first watchdog 115-1 but is not limited thereto and may include any type of device as long as the device can monitor the first controller 114. Particularly, the first watchdog 115-1 may include a first window watchdog that has a deadline, in other words, a start and an end.

The first power converter 116 is connected to the power supply 300 and may be provided with a first DC voltage from the power supply 300. The first power converter 116 may generate at least one first operation voltage by performing voltage conversion of the first DC voltage provided from the power supply 300.

The first power converter 116 may be connected to the first sensor 111, the first communicator 112, the first steering motor power supply 113, the first controller 114, and the first controller monitor 115. The first power converter 116 may provide at least one operation voltage that has been generated for the first sensor 111, the first communicator 112, the first steering motor power supply 113, the first controller 114, and the first controller monitor 115.

Here, the first operation voltage may be a voltage that can operate the first sensor 111, the first communicator 112, the first steering motor power supply 113, the first controller 114, and the first controller monitor 115. Accordingly, there may be a plurality of first operation voltages, and the first operation voltages may be individually changed and generated in accordance with operation voltages of the first sensor 111, the first communicator 112, the first steering motor power supply 113, the first controller 114, and the first controller monitor 115.

In addition, the first power converter 116 may include a DC-DC converter. Here, the DC-DC converter may include a buck converter but is not limited thereto and may include any type of converter that can be provided with a first DC voltage and covert the first DC voltage into a first operation voltage lower than the first DC voltage that has been provided.

In addition, the first power converter 116 may include a first regulator 116-1. Here, the first regulator 116-1 is provided with a first DC voltage and can convert the first DC voltage into a first operation voltage lower than the first DC voltage that has been provided.

Meanwhile, the second steering controller 120 monitors the operation state of the first steering controller 110 currently controlling the steering motor through the internal communication network 200 and, in a case in which the operation state of the first steering controller 110 is abnormal as a result of the monitoring, may control the steering motor 600 using at least one of the second sensor 121, the second communicator 122, the second steering motor power supply 123, the second controller 124, the second controller monitor 125, or the second power converter 126.

For example, the second steering controller 120 monitors the operation state of the first steering controller 110 currently controlling the steering motor through the internal communication network 200 and, in a case in which the operation state of the first steering controller 110 is abnormal as a result of the monitoring, in other words, in a case in which at least one piece of information among the first motor position information, the first temperature information, and the first assist current information of the first sensor 111, the state information of the vehicle of the first communicator 112, and at least one of the first assist current of the first steering motor power supply 113, the first gate signal of the first controller 114, the first watchdog signal of the first controller monitor 115, or the first operation voltage of the first power converter 116 are abnormal, may control the steering motor 600 by using at least one of the second sensor 121, the second communicator 122, the second steering motor power supply 123, the second controller 124, the second controller monitor 125, or the second power converter 126 respectively performing the same functions of the first sensor 111, the first communicator 112, the first steering motor power supply 113, the first controller 114, the first controller monitor 115, and the first power converter 116, in other words, at least one piece of information among the second motor position information, the second temperature information, and the second assist current information of the second sensor 121, the state information of the vehicle of the second communicator 122, and at least one of the second assist current of the second steering motor power supply 13, the second gate signal of the second controller 124, the second watchdog signal of the second controller monitor 125, or the second operation voltage of the second power converter 126.

Figure 3:
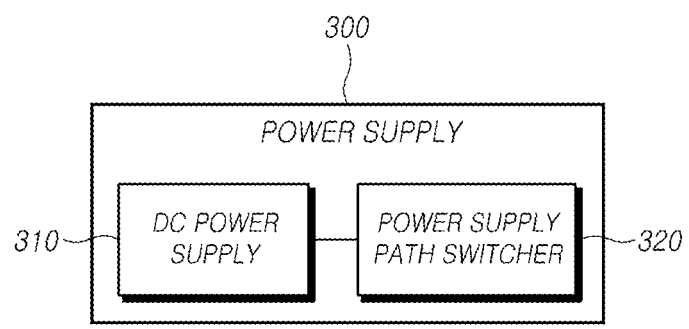
FIG. 3 is a whole block configuration diagram illustrating a power supply according to these embodiments.

FIG. 3 is a whole block configuration diagram illustrating a power supply according to these embodiments.

Referring to FIG. 3, the power supply 300 according to these embodiments may be formed to include a DC power supply 310, a power path switcher 320, and the like.

The DC power supply 310 may provide a DC voltage. Here, the DC voltage may include a first DC voltage and a second DC voltage. Particularly, the first DC voltage and the second DC voltage may have the same DC voltage.

The DC power supply 310 may provide the first DC voltage for the first steering controller 110. Particularly, the first DC voltage may be provided for the first regulator 116-1 of the first power converter 116 and the first inverter 113-2 of the first steering motor power supply 113.

Then, the DC power supply 310 may provide the second DC voltage for the second steering controller 120. Particularly, the second DC voltage may be provided for the second regulator 126-1 of the second power converter 126 and the second inverter 123-2 of the second steering motor power supply 123.

The power supply 300 according to these embodiments may further include the power path switcher 320. The power path switcher 320 may be connected to the DC power supply 310. The power path switcher 320 may be provided with a DC voltage from the DC power supply 310. Particularly, the power path switcher 320 may be provided with a first DC voltage and a second DC voltage from the DC power supply 310.

The power path switcher 320 is provided with the first DC voltage and the second DC voltage from the DC power supply 310 and may provide the first DC voltage for the first steering controller 110 (in other words, the first regulator 116-1 of the first power converter 116 and the first inverter 113-2 of the first steering motor power supply 113) and provide the second DC voltage for the second steering controller (120) (in other words, the second regulator 126-1 of the second power converter 126 and the second inverter 123-2 of the second steering motor power supply 123) by controlling the power supply path.

Meanwhile, the second steering controller 120 monitors the operation state of the first steering controller 110 currently controlling the steering motor through the internal communication network 200 and, in a case in which the first DC voltage supplied from the DC power supply 310 (or the power path switcher 320) to the first steering controller 110 is abnormal as a result of the monitoring, may be supplied with the second DC voltage from the DC power supply 310 (or the power path switcher 320) and control the steering motor 600 based on that.

Figure 4:
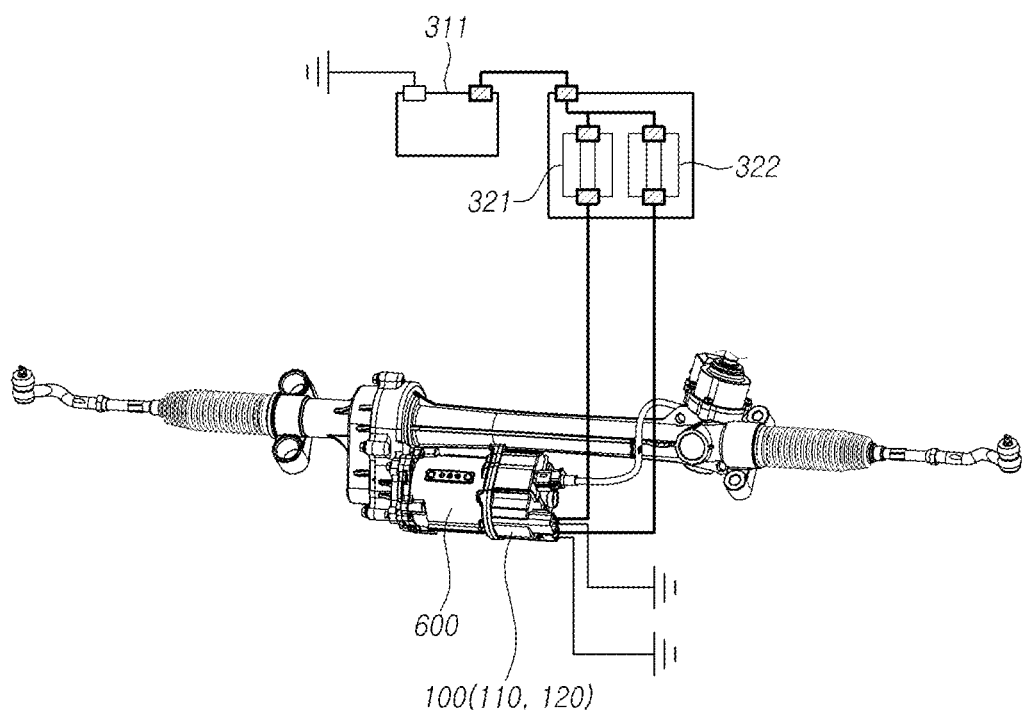
FIG. 4 is a specific diagram illustrating a power supply according to these embodiments.

FIG. 4 is a specific diagram illustrating a power supply according to these embodiments.

Referring to FIG. 4, the power supply 300 according to these embodiments may include a DC power supply 310 and a power path switcher 320. Particularly, as illustrated in the drawing, the DC power supply 310 may include a battery 311. Here, the battery 311 may supply a DC voltage 12 V but is not limited thereto and may supply any DC voltage.

As illustrated in the drawing, the power path switcher 320 may include a first fuse 321 and a second fuse 322. The first fuse 321 may be positioned between the DC power supply 310 (or the battery 311) and the first steering controller 110. The first fuse 321 may provide the first DC voltage provided from the DC power supply 301 (or the battery 311) for the first steering controller 110 (in other words, the first regulator 116-1 of the first power converter 116 and the first inverter 113-2 of the first steering motor power supply 113).

The second fuse 322 may be positioned between the DC power supply 310 (or the battery 311) and the second steering controller 120. The second fuse 322 may provide the second DC voltage provided from the DC power supply 301 (or the battery 311) for the second steering controller 120 (in other words, the second regulator 126-1 of the second power converter 126 and the second inverter 123-2 of the second steering motor power supply 123).

Here, each of the first fuse 321 and the second fuse 322 may include E-fuses but is not limited thereto and may include any type of fuse that can supply/block a DC voltage supplied from the DC power supply 310 to/from the steering controller. Particularly, the E-fuses may have a bi-directional capability.

Meanwhile, the second steering controller 120 monitors the operation state of the first steering controller 110 currently controlling the steering motor through the internal communication network 200 and, in a case in which the first fuse 321 is cut off as a result of the monitoring, may be supplied with the second DC voltage through the second fuse 322 and control the steering motor based on that.

The power supply 300 according to these embodiments may supply the first DC voltage and the second DC voltage through one or two or more batteries 311. As described above, in a case in which the first DC voltage supplied from the DC power supply to the first steering controller is abnormal, the steering apparatus for a vehicle according to these embodiments is supplied with the second DC voltage from the DC power supply through the second steering controller and controls the steering motor based on that and accordingly, can be continuously supplied with the second DC voltage through a redundant battery even if the control right is moved to another steering controller performing a backup function and can perform assistance without the steering performance of the vehicle decreased or lost, and can improve the redundancy and the reliability of the vehicle.

Figure 5:
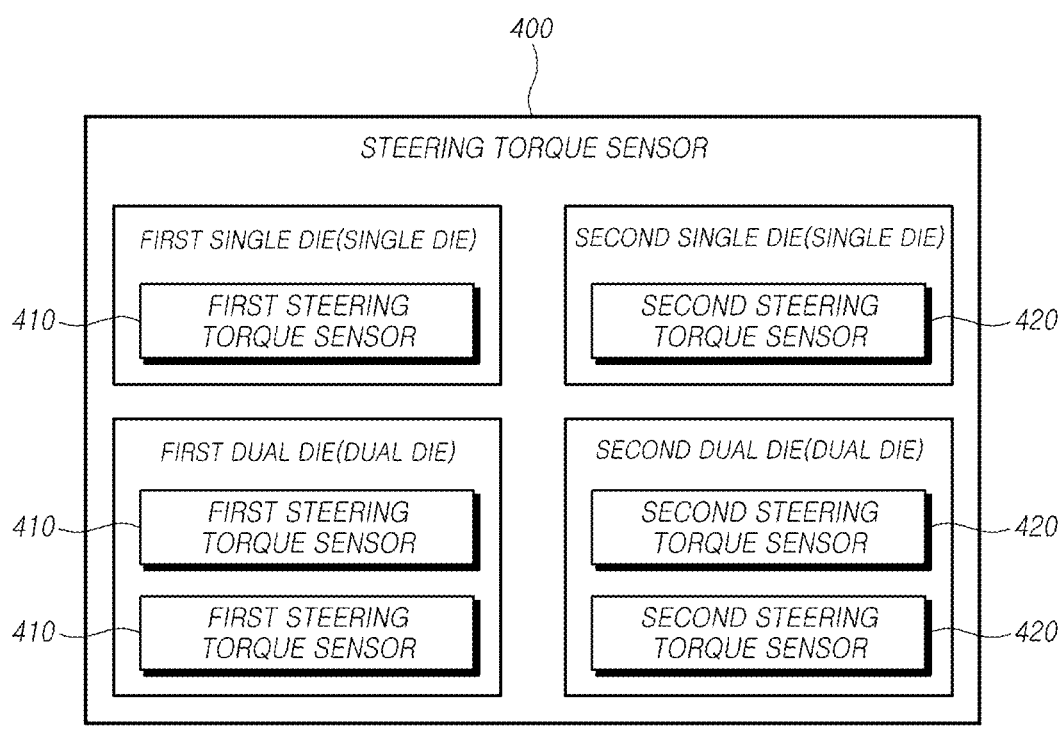
FIG. 5 is a specific block configuration diagram illustrating a steering torque sensor according to these embodiments.

FIG. 5 is a specific block configuration diagram illustrating a steering torque sensor according to these embodiments.

Referring to FIG. 5, the steering torque sensor 400 may include at least one first steering torque sensor 410 and at least one second steering torque sensor 420.

In addition, the steering torque sensor 400 may include a die. The die may include at least one of a single die including one steering torque sensor or a dual die including two steering torque sensors but is not limited thereto, and the die may be changed in form in accordance with the number of steering torque sensors.

For example, the steering torque sensor 400 may be formed to include a first single die including one first steering torque sensor 410, a first dual die including two first steering torque sensors 410, a second single die including one second steering torque sensor 420, a second dual die including two second steering torque sensors 420, and the like. Here, at least the first steering torque sensor 410 measures a torque of the steering wheel and may provide torque information of the steering wheel for the first steering controller 110 (or the first controller 114). At least the second steering torque sensor 420 measures a torque of the steering wheel and may provide torque information of the steering wheel for the second steering controller 120 (or the second controller 124).

Figure 6:
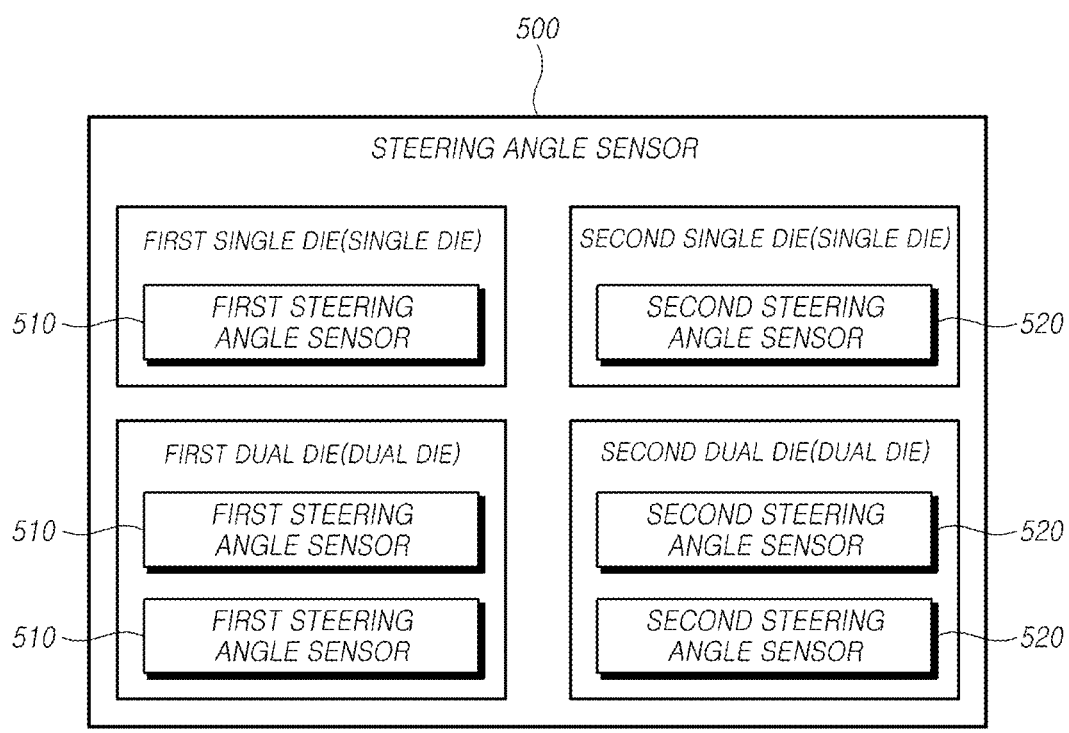
FIG. 6 is a specific block configuration diagram illustrating a steering angle sensor according to these embodiments.

FIG. 6 is a specific block configuration diagram illustrating a steering angle sensor according to these embodiments.

Referring to FIG. 6, the steering angle sensor 500 may include at least one first steering angle sensor 510 and at least one second steering angle sensor 520.

In addition, the steering angle sensor 500 may include a die. The die may include at least one of a single die including one steering torque sensor or a dual die including two steering torque sensors but is not limited thereto, and the die may be changed in form in accordance with the number of steering torque sensors.

For example, the steering angle sensor 500 may be formed to include a first single die including one first steering angle sensor 510, a first dual die including two first steering angle sensors 510, a second single die including one second steering angle sensor 520, a second dual die including two second steering angle sensors 520, and the like. Here, at least the first steering angle sensor 510 measures a steering angle of the steering wheel and may provide steering angle information of the steering wheel for the first steering controller 110 (or the first controller 114). At least the second steering angle sensor 520 measures a steering angle of the steering wheel and may provide steering angle information of the steering wheel for the second steering controller 120 (or the second controller 124).

Figure 7:
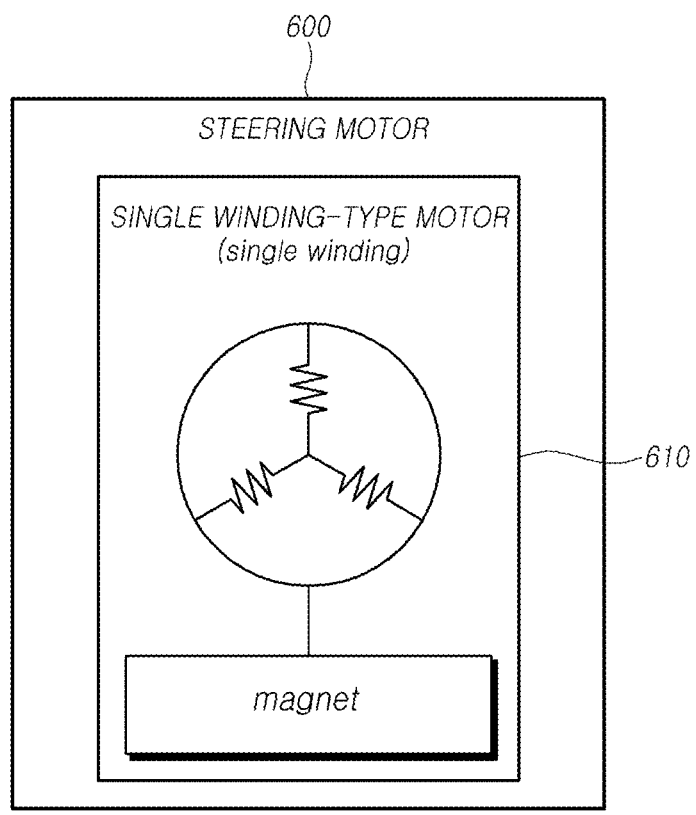
FIG. 7 is a specific diagram illustrating a steering motor according to these embodiments.

FIG. 7 is a specific diagram illustrating a steering motor according to these embodiments.

Referring to FIG. 7, the steering motor 600 according to these embodiments may include a single winding-type motor 610. Particularly, the steering motor 600 may include a three-phase single winding-type motor but is not limited thereto and may include any type of motor that can provide an auxiliary steering force for wheels of the vehicle. A magnet may include a ring magnet but is not limited thereto, and the shape of the magnet may be changed.

Meanwhile, the first steering controller 110 and the second steering controller 120 may control the steering motor 610 of a single winding type. The second steering controller 120 monitors the operation state of the first steering controller 110 currently controlling the steering motor 610 of the single winding type through the internal communication network 200 and, in a case in which the operation state of the first steering controller 110 is abnormal as a result of the monitoring, may control the steering motor 610 of the single winding type instead of the first steering controller 110.

The magnetic flux of the magnet may be measured through the first motor position sensor 111-3 and the second motor position sensor 121-3 of the first steering controller 110 and the second steering controller 120. The first motor position sensor 111-3 and the second motor position sensor 121-3 of the first steering controller 110 and the second steering controller 120 measure a position of the steering motor 600 based on the measured magnetic flux of the magnet and may acquire position information of the steering motor 600 based on the measured position.

Figure 8:
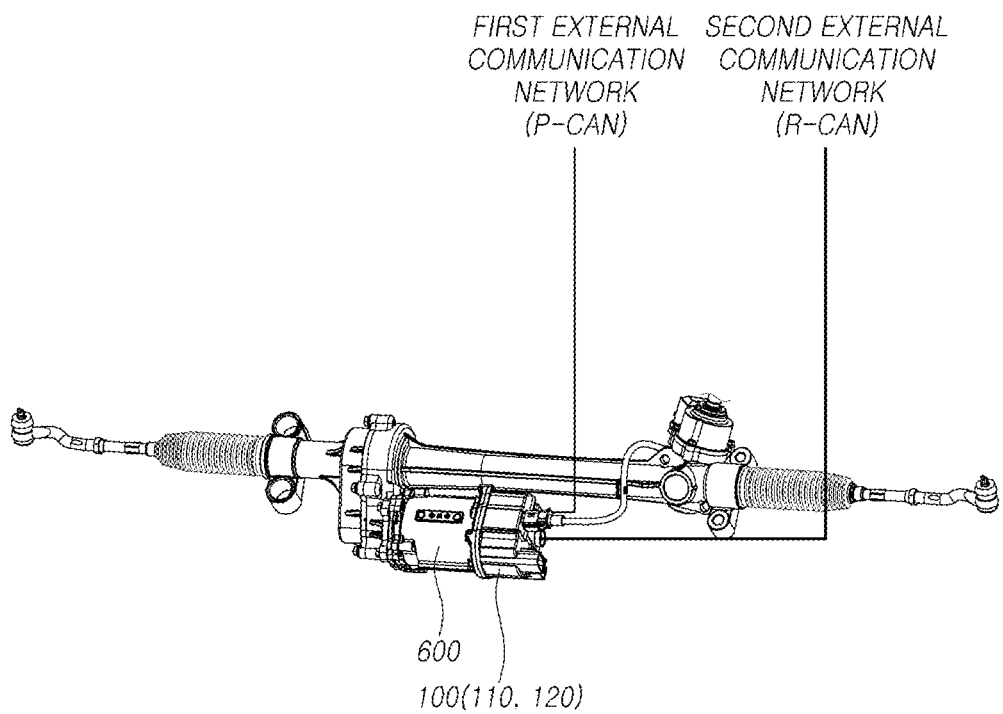
FIG. 8 is a diagram illustrating an external communication network according to these embodiments.

FIG. 8 is a diagram illustrating an external communication network according to these embodiments.

Referring to FIG. 8, the external communication network 700 according to these embodiments may include a first external communication network 710 and a second external communication network 720.

As described above, the first external communication network 710 may represent a primary external communication network connecting the first steering controller 110 and the vehicle 2000 and, particularly, may be a primary CAN (P-CAN).

The second external communication network 720 may represent a redundant external communication network connecting the second steering controller 120 and the vehicle 2000 and may be a redundant CAN (R-CAN).

Figure 9:
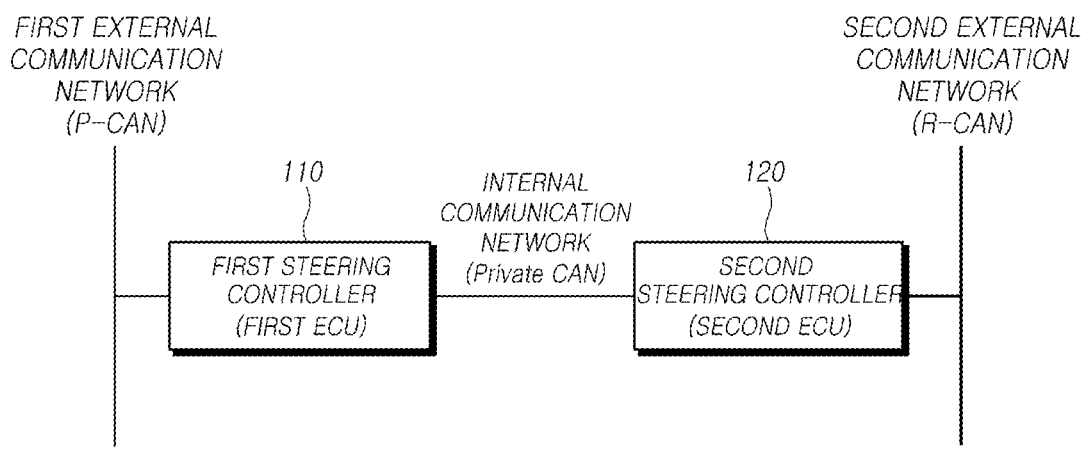
FIG. 9 is a diagram illustrating an internal communication network and an external communication network according to these embodiments.

Meanwhile, the steering controllers 110 and 120 are provided with state information of the vehicle from the vehicle 2000 through the external communication networks 710 and 720 and may control the steering motor 600 based on the provided state information. FIG. 9 is a diagram illustrating an internal communication network and an external communication network according to these embodiments.

Referring to FIG. 9, the first steering controller 110 may include a first ECU, and the second steering controller 120 may include a second ECU. The first steering controller 110 may be connected to the first external communication network 710, and the second steering controller 120 may be connected to the second external communication network 720. The first steering controller 110 and the second steering controller 120 may be connected to each other through the internal communication network 200. Meanwhile, the second steering controller 120 monitors the operation state of the first steering controller 110 through the internal communication network 200 and, in a case in which the state information of the vehicle provided from the vehicle 2000 through the first external communication network 710 is abnormal as a result of the monitoring, may be provided with the state information of the vehicle from the vehicle 2000 through the second external communication network 720 and control the steering motor 600 based on the provided state information.

Hereinafter, an operation of the steering apparatus for a vehicle will be described with reference to FIGS. 10 to 12. In description presented below, the first steering controller 110 will be referred to as a master ECU. The second steering controller 120 will be referred to as a backup ECU in the description.

FIG. 10 is a diagram illustrating a normal operation state of a steering apparatus for a vehicle according to these embodiments.

Referring to FIG. 10, first, in a case in which ignition IGN is in an off state, and the engine is in a stop state, the master ECU and the backup ECU may be in an off state. Thereafter, in a case in which the ignition IGN is switched to an on state, and the engine is in the stop state, the master ECU and the backup ECU may test an initialization state and, in a case in which a result of the initialization state test is normal, may operate the steering apparatus for the vehicle in a passive (PASSIVE) state.

Thereafter, in a case in which the engine is switched to a run state in the on state of the ignition IGN, the master ECU may assist the steering apparatus for the vehicle, and the backup ECU may monitor the master ECU in a standby state.

Thereafter, in a case in which the engine is switched to a stop state in the on state of the ignition IGN, the steering apparatus for the vehicle may be operated in a passive (PASSIVE) state. Thereafter, in a case in which the ignition IGN is switched to an off state in the stop state of the engine, the master ECU and the backup ECU may be switched off.

Figure 11:
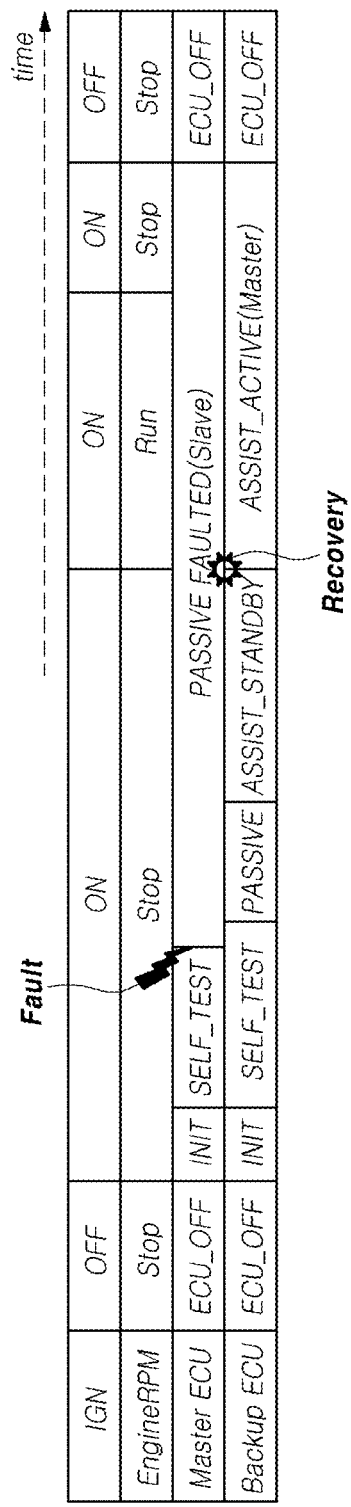
FIG. 11 is a diagram illustrating an operation state in a case in which a master ECU of a steering apparatus for a vehicle according to these embodiments is abnormal.

FIG. 11 is a diagram illustrating an operation state in a case in which a master ECU of a steering apparatus for a vehicle according to these embodiments is abnormal.

Referring to FIG. 10, first, in a case in which the ignition IGN is in the off state, and the engine is in the stop state, the master ECU and the backup ECU may be in the off state. Thereafter, in a case in which the ignition IGN is switched to the on state, and the engine is in the stop state, the master ECU and the backup ECU may test the initialization state and, in a case in which the master ECU is abnormal as a result of the test of the initialization state, the master ECU may be operated as a slave, and the backup ECU may operate the steering apparatus for the vehicle in the passive (PASSIVE) state and may be switched to a standby state for assisting the steering apparatus for the vehicle.

Thereafter, in a case in which the engine is switched to a run state in the on state of the ignition IGN, the master ECU may be continuously operated as a slave, and the backup ECU may assist the steering apparatus for the vehicle instead of the master ECU.

Thereafter, in a case in which the engine is switched to the stop state in the on state of the ignition IGN, the master ECU may be continuously operated as the slave, and the backup ECU may assist the steering apparatus for the vehicle instead of the master ECU. Thereafter, in a case in which the ignition IGN is switched to the off state in the stop state of the engine, the master ECU and the backup ECU may be switched to be off.

Figure 12:
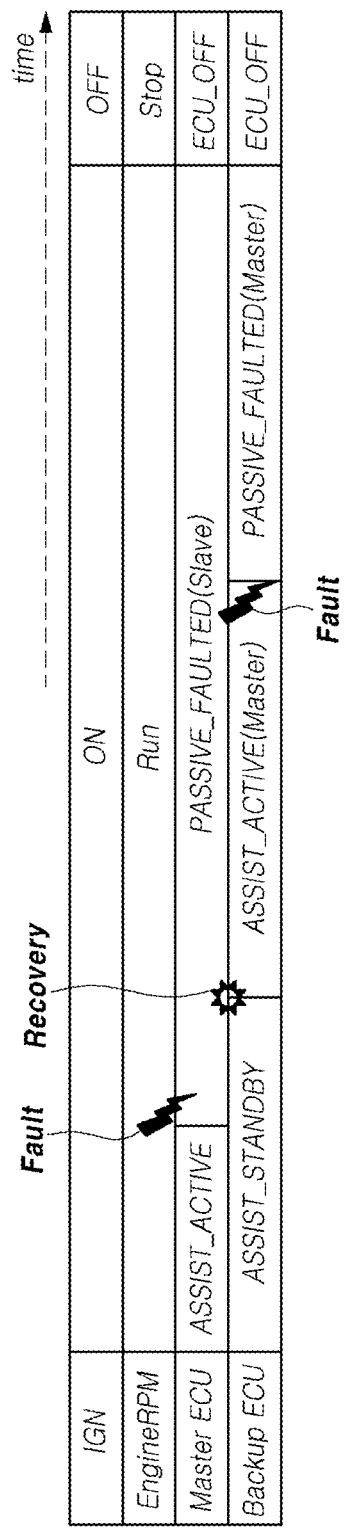
FIG. 12 is a diagram illustrating an operation state in a case in which a master ECU and a backup ECU of a steering apparatus for a vehicle according to these embodiments is abnormal.

FIG. 12 is a diagram illustrating an operation state in a case in which a master ECU and a backup ECU of a steering apparatus for a vehicle according to these embodiments is abnormal.

Referring to FIG. 12, in a case in which the ignition IGN is in the on state, the engine is in the run state, and the backup ECU assists the steering apparatus for the vehicle instead of the master ECU due to abnormality of the master ECU, if the backup ECU becomes abnormal, the vehicle may switched the steering apparatus for the vehicle to a reduced assist mode or a manual mode.

Hereinafter, a method of steering a vehicle according to these embodiments will be described with reference to the attached drawings. Particularly, parts that are duplicates of those of the steering apparatus for the vehicle according to these embodiments described above with reference to FIGS. 1 to 12 will be omitted for the simplicity of description.

A method of steering a vehicle according to these embodiments may be performed using a steering apparatus for the vehicle according to these embodiments including a first steering controller 110 and a second steering controller 120 that are connected to each other through an internal communication network 200. Particularly, the first steering controller 110 and the second steering controller 120 may be redundantly configured to be the same.

Figure 13:
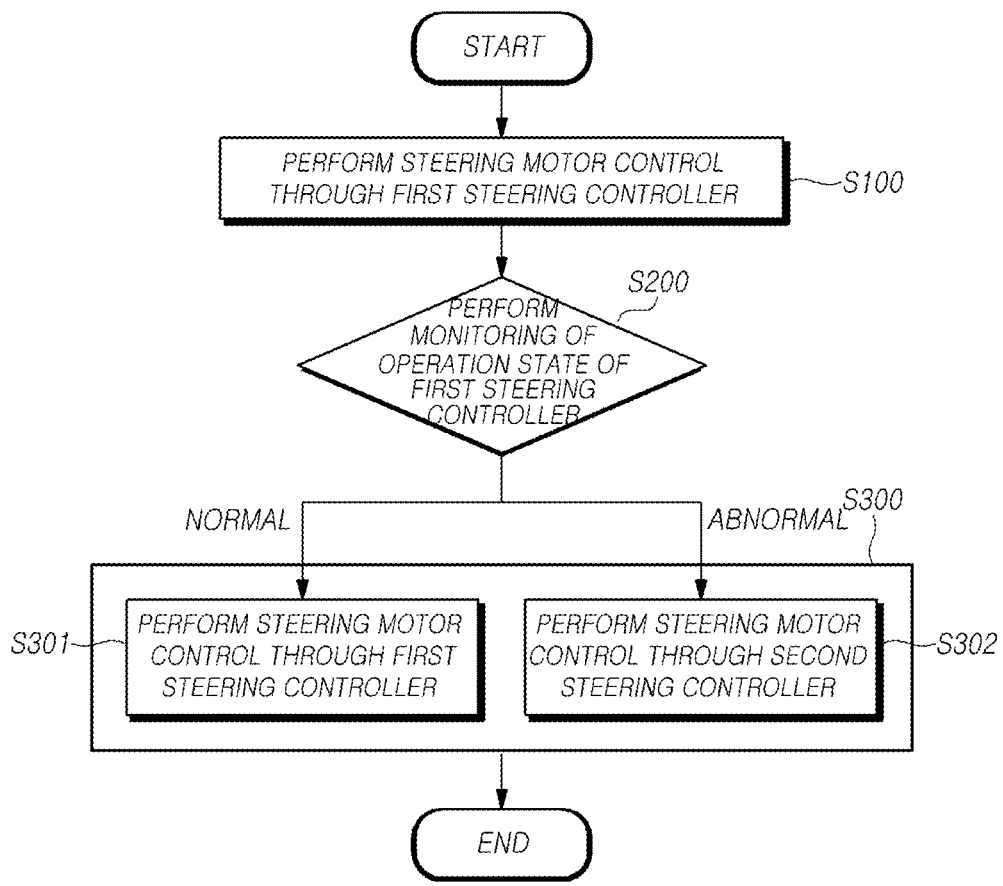
FIG. 13 is a whole flowchart illustrating a method of steering a vehicle according to these embodiments.

FIG. 13 is a whole flowchart illustrating a method of steering a vehicle according to these embodiments.

Referring to FIG. 13, the method of steering a vehicle according to these embodiments may include a step of controlling a steering motor through a first steering controller (S100), a step of monitoring an operation state of the first steering controller through a second steering controller (S200), and a step of determining a control right for the steering motor through the second steering controller (S300).

First, the steering motor may be controlled through the first steering controller (S100).

Here, the steering motor may include a motor of a single winding type.

The operation state of the first steering controller may be monitored through the second steering controller (S200). For example, the second steering controller may monitor the operation state of the first steering controller through an internal communication network.

Thereafter, a control right for the steering motor may be determined in accordance with a result of the monitoring of Step S200 through the second steering controller (S300).

In other words, in a case in which the operation state of the first steering controller currently controlling the steering motor is normal as a result of the monitoring of Step S200, the second steering controller may cause the control right for the steering motor to be continuously held by the first steering controller 110 (S301).

On the other hand, in a case in which the operation state of the first steering controller currently controlling the steering motor is abnormal as a result of the monitoring of Step S200, the second steering controller may move the control right for the steering motor from the first steering controller to the second steering controller (S302).

FIGS. 14 to 18 are flowcharts illustrating a method of steering a vehicle according to these embodiments more specifically.

Figure 14:
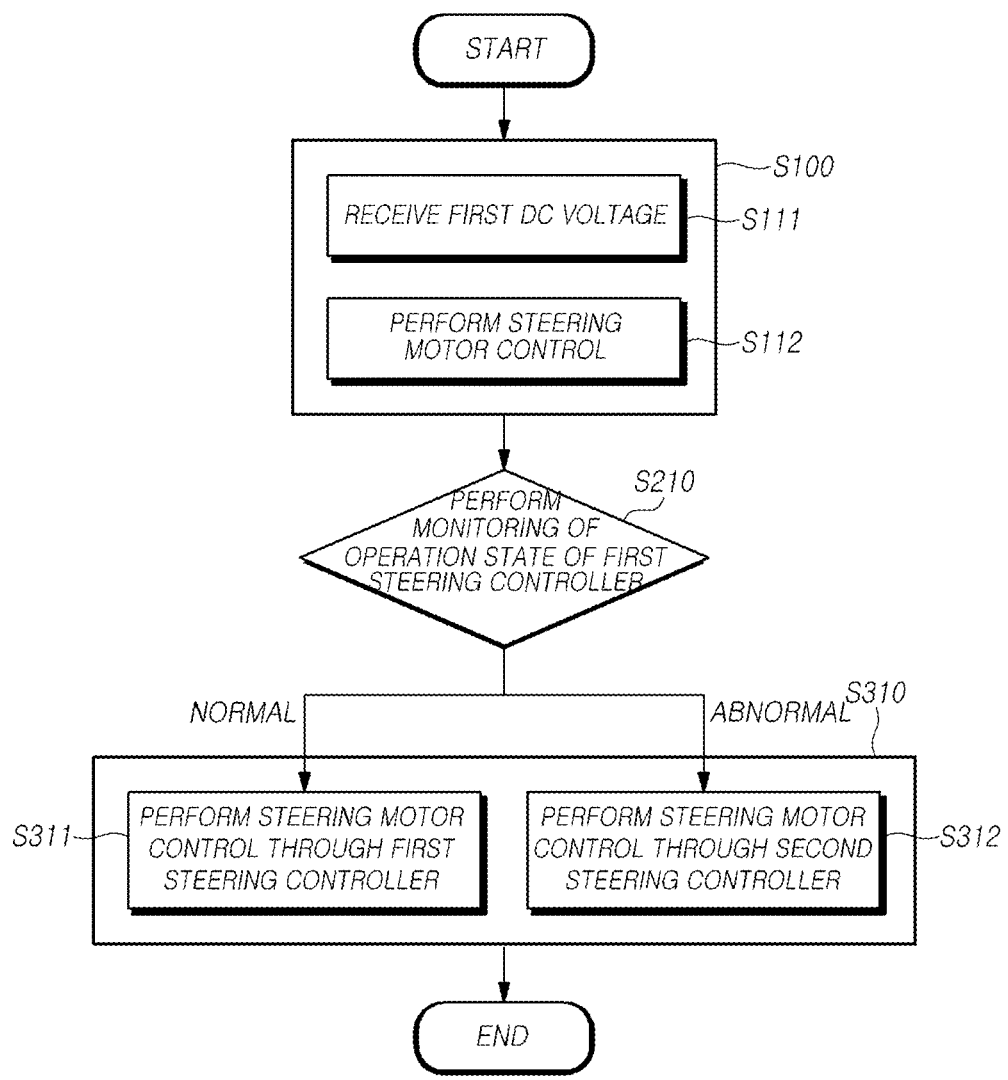
FIGS. 14 to 18 are flowcharts illustrating a method of steering a vehicle according to these embodiments more specifically.

Referring to FIG. 14, first, the first steering controller may be provided with a first DC voltage from the DC power supply (S111). For example, first, the DC power supply may provide a first voltage. Thereafter, the first steering controller may be provided with the first voltage through the first fuse.

Thereafter, the steering motor may be controlled based on the first DC voltage supplied to the first steering controller from the DC power supply (or the first fuse) (S112). Thereafter, the operation state of the first steering controller may be monitored through the second steering controller (S210). For example, the second steering controller may monitor the operation state of the first steering controller through an internal communication network. The control right for the steering motor may be determined in accordance with a result of the monitoring of Step S210 through the second steering controller (S310).

In other words, in a case in which the first DC voltage supplied from the DC power supply to the first steering controller is normal as a result of the monitoring, the second steering controller may cause the control right for the steering motor to be continuously held by the first steering controller (S311).

On the other hand, in a case in which the first DC voltage supplied from the DC power supply to the first steering controller is abnormal as a result of the monitoring, the second steering controller may move the control right for the steering motor from the first steering controller to the second steering controller (S312).

More specifically, first, in a case in which the first DC voltage supplied from the DC power supply to the first steering controller is abnormal as a result of the monitoring, the second steering controller may be provided with a second DC voltage from the DC power supply. Thereafter, the second steering controller may control the steering motor based on the second DC voltage that has been provided from the DC power supply instead of the first steering controller.

Particularly, first, in a case in which the first fuse is cut off as a result of the monitoring, the second steering controller may be provided with the second DC voltage from the DC power supply through the second fuse. Thereafter, the second steering controller may control the steering motor based on the second DC voltage supplied from the DC power supply through the second fuse instead of the first steering controller.

Figure 15:
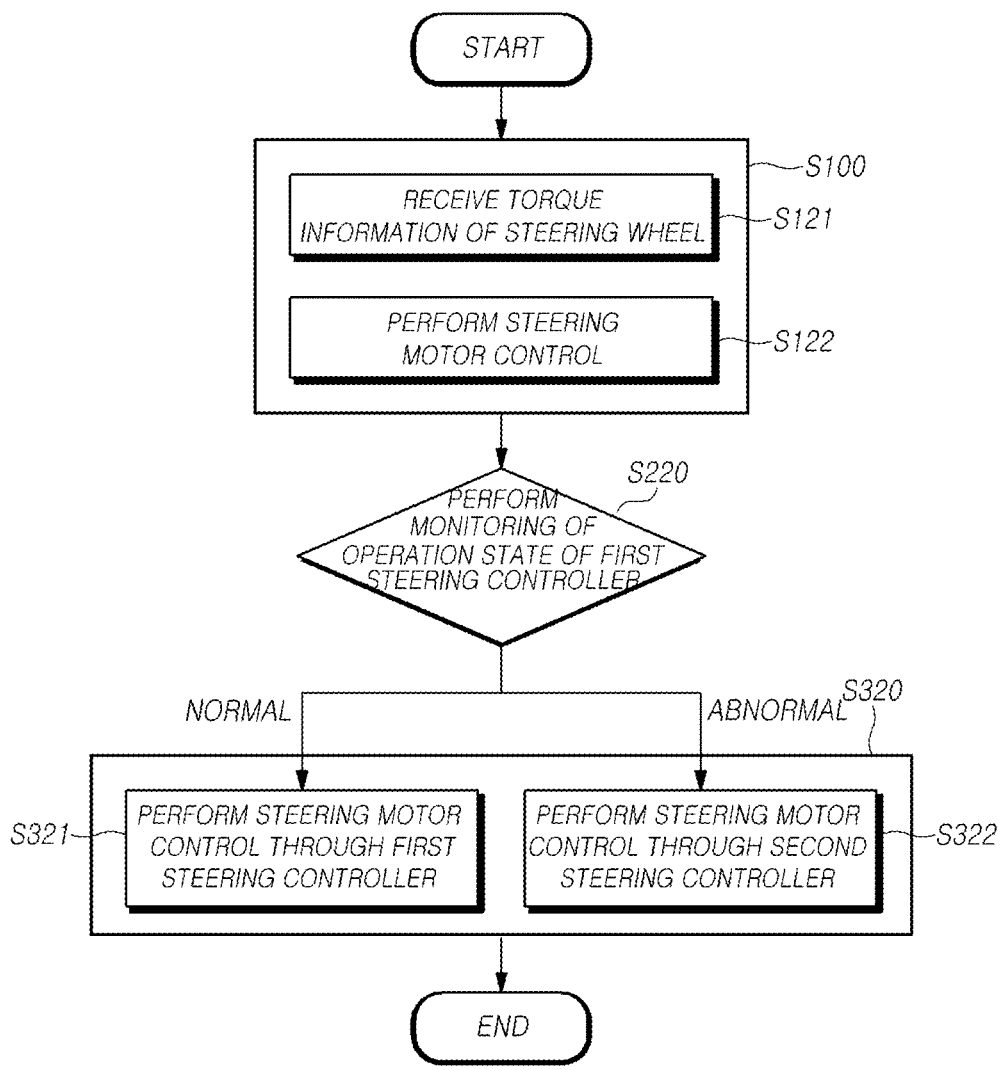

Referring to FIG. 15, first, the first steering controller may be provided with torque information of the steering wheel from at least one first steering torque sensor (S121).

Thereafter, the steering motor may be controlled based on the torque information of the steering wheel supplied from at least one first steering torque sensor to the first steering controller (S122).

Thereafter, the operation state of the first steering controller may be monitored through the second steering controller (S220). For example, the second steering controller may monitor the operation state of the first steering controller through an internal communication network.

Thereafter, the control right for the steering motor may be determined in accordance with a result of the monitoring of Step S220 through the second steering controller (S320).

In other words, in a case in which the torque information of the steering wheel provided from at least one first steering torque sensor to the first steering controller is normal as a result of the monitoring, the second steering controller may cause the control right for the steering motor to be continuously held by the first steering controller (S321).

On the other hand, in a case in which the torque information of the steering wheel provided from at least one first steering torque sensor to the first steering controller is abnormal as a result of the monitoring, the second steering controller may move the control right for the steering motor from the first steering controller to the second steering controller (S322).

More specifically, first, in a case in which the torque information of the steering wheel provided from at least one first steering torque sensor to the first steering controller is abnormal as a result of the monitoring, the second steering controller may be provided with the torque information of the steering wheel from at least one second steering torque sensor. Thereafter, the second steering controller may control the steering motor based on the torque information of the steering wheel provided from at least one second steering torque sensor instead of the first steering controller.

Figure 16:
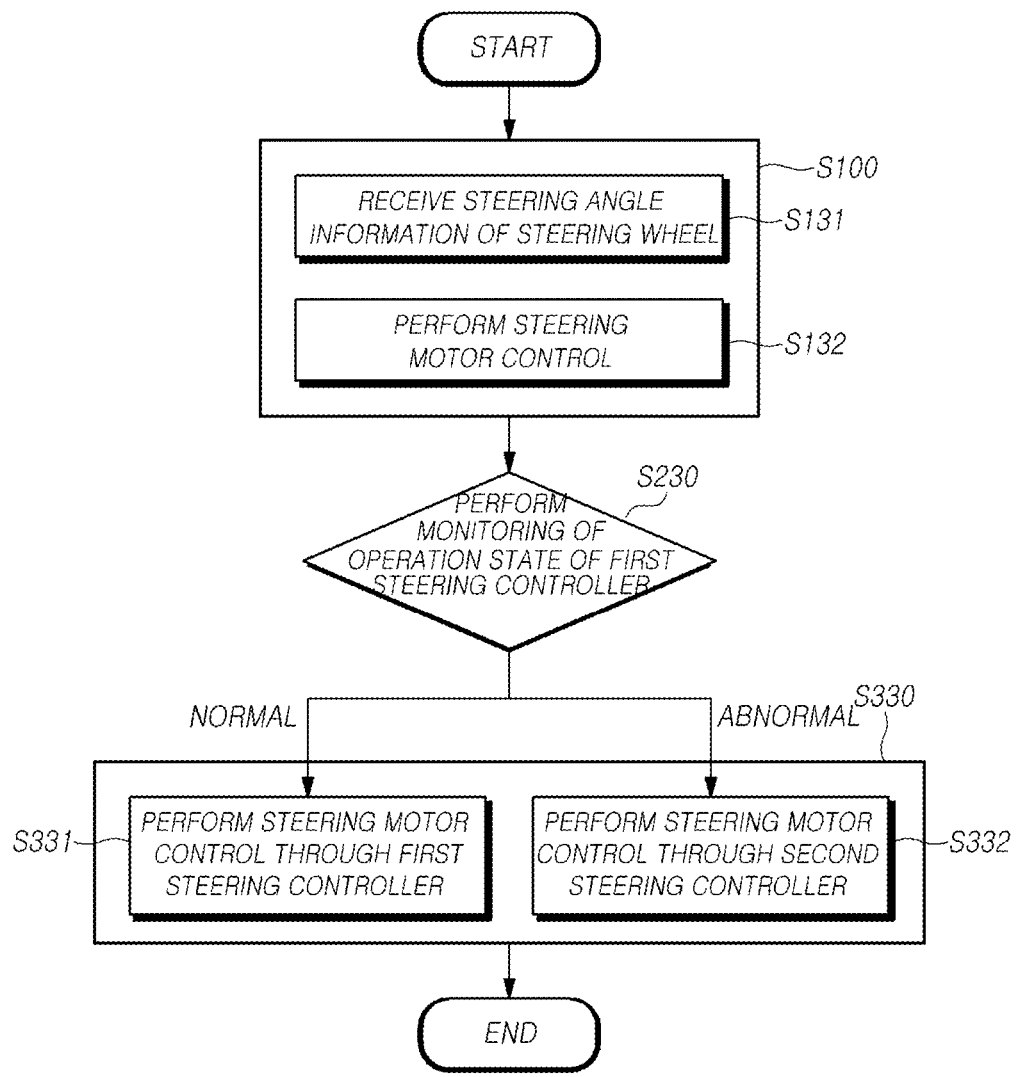

Referring to FIG. 16, first, the first steering controller may be provided with steering angle information of the steering wheel from at least one first steering angle sensor (S131).

Thereafter, the steering motor may be controlled based on the steering angle information of the steering wheel supplied from at least one first steering angle sensor to the first steering controller (S132).

Thereafter, the operation state of the first steering controller may be monitored through the second steering controller (S230). For example, the second steering controller may monitor the operation state of the first steering controller through an internal communication network.

Thereafter, the control right for the steering motor may be determined in accordance with a result of the monitoring of Step S230 through the second steering controller (S330).

In other words, in a case in which the steering angle information of the steering wheel provided from at least one first steering angle sensor to the first steering controller is normal as a result of the monitoring, the second steering controller may cause the control right for the steering motor to be continuously held by the first steering controller (S331).

On the other hand, in a case in which the steering angle information of the steering wheel provided from at least one first steering angle sensor to the first steering controller is abnormal as a result of the monitoring, the second steering controller may move the control right for the steering motor from the first steering controller to the second steering controller (S332).

More specifically, first, in a case in which the steering angle information of the steering wheel provided from at least one first steering angle sensor to the first steering controller is abnormal as a result of the monitoring, the second steering controller may be provided with the steering angle information of the steering wheel from at least one second steering angle sensor. Thereafter, the second steering controller may control the steering motor based on the steering angle information of the steering wheel provided from at least one second steering angle sensor instead of the first steering controller.

Figure 17:
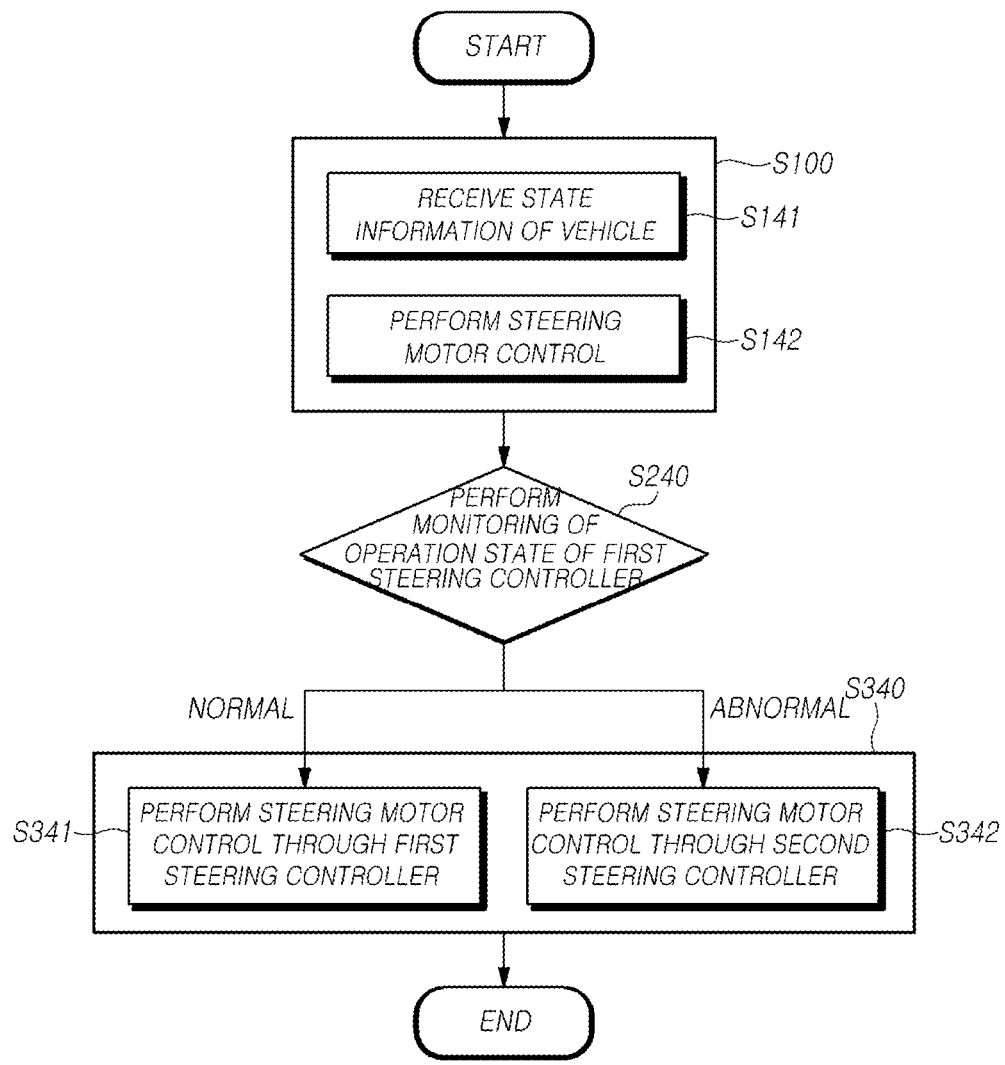

Referring to FIG. 17, first, the first steering controller may be provided with vehicle state information from the vehicle through the first external communication network (S141).

Thereafter, the steering motor may be controlled based on the vehicle state information supplied from the vehicle to the first steering controller through the first external network (S142).

Thereafter, the operation state of the first steering controller may be monitored through the second steering controller (S240). For example, the second steering controller may monitor the operation state of the first steering controller through an internal communication network.

Thereafter, the control right for the steering motor may be determined in accordance with a result of the monitoring of Step S240 through the second steering controller (S340).

In other words, in a case in which the vehicle state information provided from the vehicle through the first external communication network is normal as a result of the monitoring, the second steering controller may cause the control right for the steering motor to be continuously held by the first steering controller (S341).

On the other hand, in a case in which the vehicle state information of the steering wheel provided from the vehicle through the first external communication network is abnormal as a result of the monitoring, the second steering controller may move the control right for the steering motor from the first steering controller to the second steering controller (S342).

More specifically, first, in a case in which the vehicle state information provided from the vehicle through the first external communication network is abnormal as a result of the monitoring, the second steering controller may be provided with the vehicle state information from the vehicle through the second external communication network. Thereafter, the second steering controller may control the steering motor based on the vehicle state information provided from the vehicle through the second external communication network instead of the first steering controller.

Figure 18:
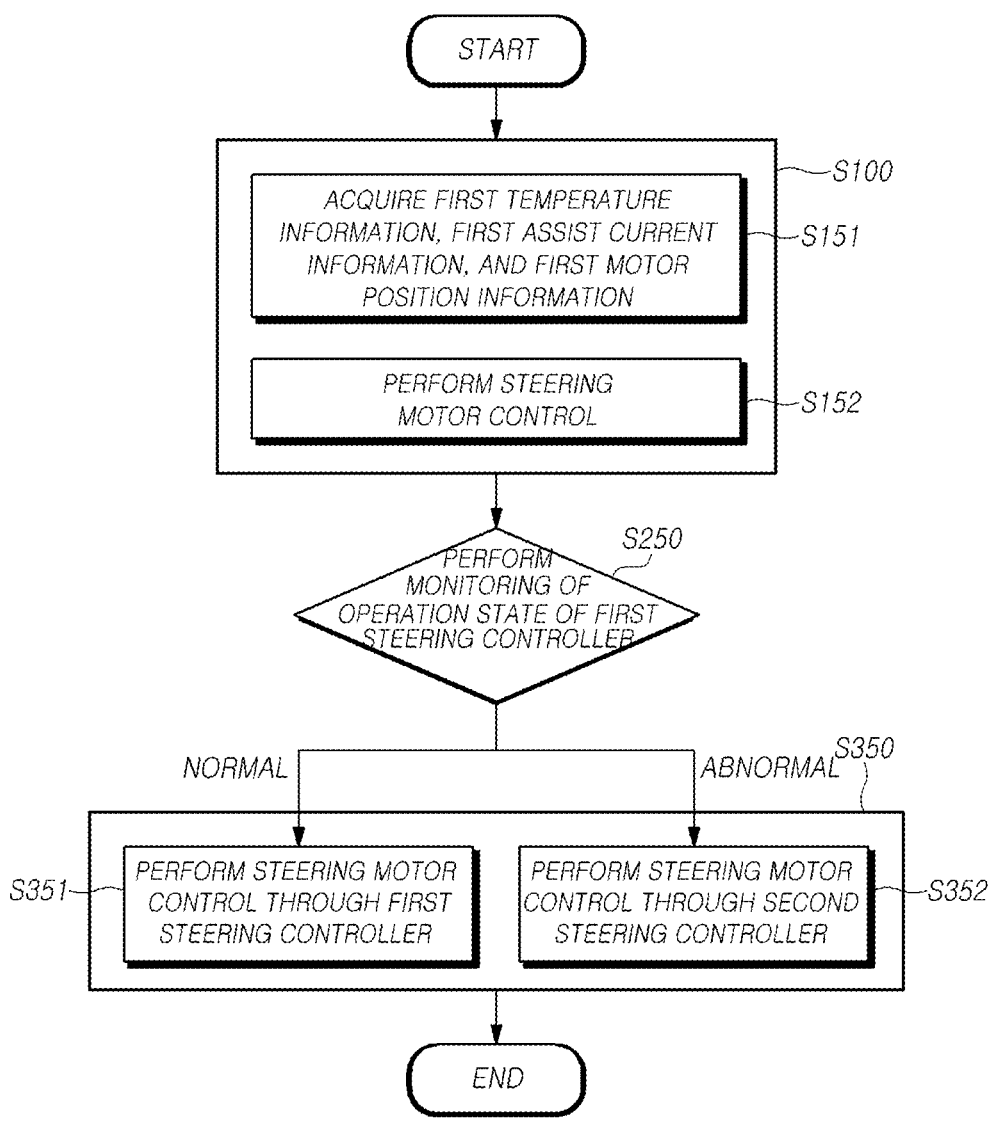

Referring to FIG. 18, first, the first temperature information of the first steering controller, the first assist current information provided by the steering motor, and the first motor position information of the steering motor may be acquired through the first steering controller (S151).

Thereafter, a first gate signal is generated based on the first temperature information, the first assist current information, and the first motor position information acquired through the first steering controller, a first assist current is generated by adjusting the first inverter based on the generated first gate signal, and the steering motor may be controlled based thereon (S152).

Thereafter, the operation state of the first steering controller may be monitored through the second steering controller (S250). For example, the second steering controller may monitor the operation state of the first steering controller through an internal communication network.

Thereafter, the control right for the steering motor may be determined in accordance with a result of the monitoring of Step S250 through the second steering controller (S350).

In other words, in a case in which the operation state of the first steering controller is normal as a result of the monitoring, in other words, in a case in which the first temperature information, the first assist current information, the first motor position information, the first gate signal, and the first assist current that have been acquired as above are normal, the second steering controller may cause the control right for the steering motor to be continuously held by the first steering controller (S351).

On the other hand, in a case in which the operation state of the first steering controller is abnormal as a result of the monitoring, in other words, in other words, in a case in which at least one of the first temperature information, the first assist current information, the first motor position information, the first gate signal, or the first assist current that has been acquired as above is abnormal, the second steering controller may move the control right for the steering motor from the first steering controller to the second steering controller (S352).

More specifically, first, in a case in which the operation state of the first steering controller is abnormal as a result of the monitoring, in other words, in other words, in a case in which at least one of the first temperature information, the first assist current information, the first motor position information, the first gate signal, or the first assist current that have been acquired as above is abnormal, the second steering controller may acquire the second temperature information of the second steering controller, the second assist current information provided by the steering motor, and the second motor position information of the steering motor.

Thereafter, the second steering controller, instead of the first steering controller, generates a second gate signal based on the second temperature information of the second steering controller, the second assist current information provided by the steering motor, and the second motor position information of the steering motor, generates a second assist current by adjusting the second inverter based on the generated second gate signal, and may control the steering motor based thereon.

Referring to FIGS. 14 to 18, methods of controlling a steering motor through a steering controller according to these embodiments have been individually described for the simplicity of description but are not limited thereto, and the methods illustrated in FIGS. 14 to 18 may be combined.

Figure 19:
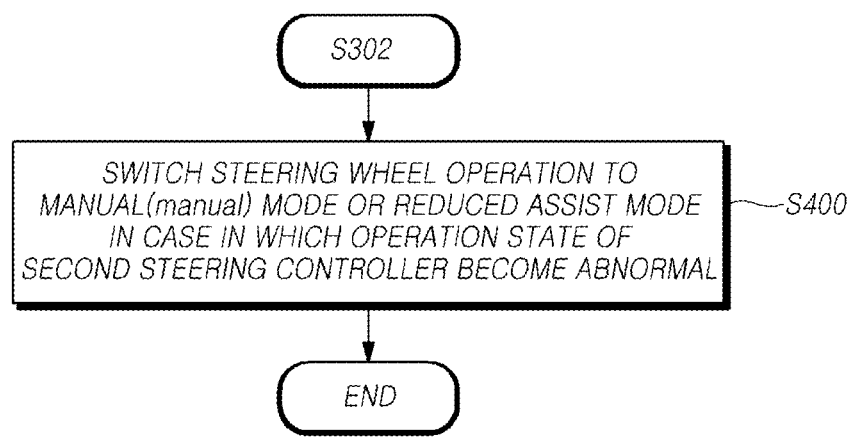
FIG. 19 is a flowchart illustrating a method of steering a vehicle more specifically in a case in which an operation state of a second steering controller according to these embodiments is abnormal.

FIG. 19 is a flowchart illustrating a method of steering a vehicle more specifically in a case in which an operation state of a second steering controller according to these embodiments is abnormal.

Referring to FIG. 19, after Step S302, in a case in which the operation state of the second steering controller becomes abnormal, the steering wheel operation may be switched to the manual mode or the reduced assist mode (S400).

In other words, after Step S302, in a case in which the operation state of the first steering controller is abnormal, and the operation state of the second steering controller becomes abnormal, the steering wheel operation may be switched to the manual mode or the reduced assist mode. It can be understood by a person skilled in a technical field to which these embodiments belong that a term "power supply" described here may represent either a device that provides at least one of a voltage, a current, power, or electric energy or at least one of a voltage, a current, power, or electric energy.

Figure 20:
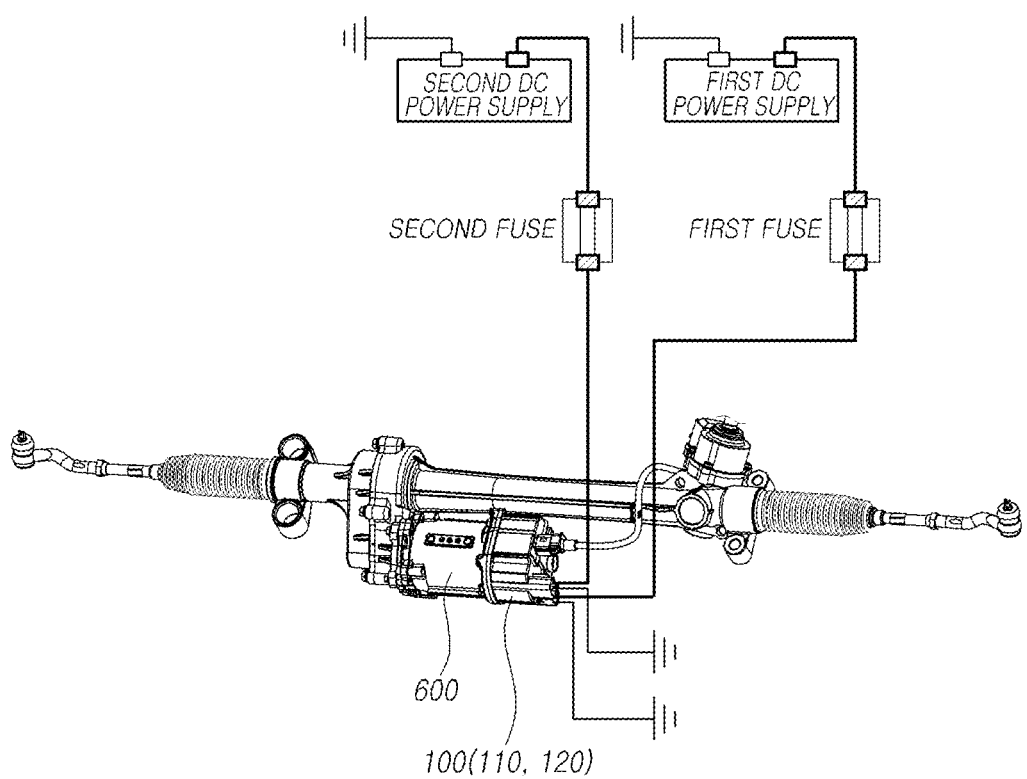
FIGS. 20 and 21 are specific diagrams illustrating a power supply according to these embodiments.
Figure 21:
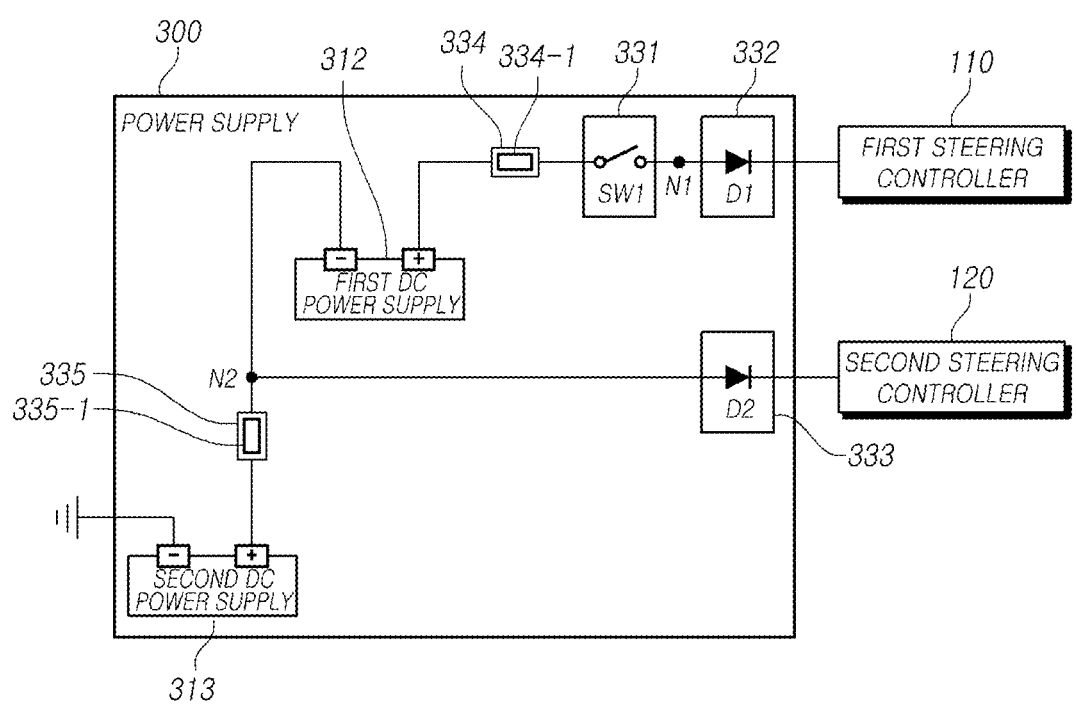

FIGS. 20 and 21 are specific diagrams illustrating a power supply according to these embodiments.

Referring to FIG. 20, the power supply 300 according to these embodiments may include a first DC power supply, a second DC power supply, a first fuse, and a second fuse. Particularly, as illustrated in the drawing, each of the first DC power supply and the second DC power supply may include a battery. Here, the battery may supply a DC voltage 12V but is not limited thereto and may supply any DC voltage.

The first fuse may be positioned between the first DC power supply and the first steering controller. The first fuse may provide a first DC power source provided from the first DC power supply for the first steering controller (in other words, the first regulator 116-1 of the first power converter 116 and the first inverter 113-2 of the first steering motor power supply 113).

The second fuse may be positioned between the second DC power supply and the second steering controller 120.

The second fuse may provide a second DC power source provided from the second DC power supply for the second steering controller 120 (in other words, the second regulator 126-1 of the second power converter 126 and the second inverter 123-2 of the second steering motor power supply 123).

Meanwhile, the second steering controller 120 monitors the operation state of the first steering controller 110 currently controlling the steering motor through the internal communication network 200 and, in a case in which the first fuse is cut off as a result of the monitoring, may be supplied with the second DC power through the second fuse and control the steering motor based on thereon.

Referring to FIGS. 1, 2, 5 to 12, 20, and 21, the first steering controller 110 and the second steering controller 120 may control the steering motor. The first steering controller 110 and the second steering controller 120 are connected to an internal communication network and may monitor mutual operation states. Since the monitoring method has been described above with reference to FIGS. 1 to 19, description thereof will be omitted below for the simplicity of description.

Here, it is assumed that the steering motor is a steering motor of a single winding type in description, but the steering motor is not limited thereto. In a steering motor of the single winding type, at least one phase (for example, three phases, five phases, five phases, six phases, or the like) may be included in one winding. Thus, the first steering controller 110 and the second steering controller 120 may be connected to one winding of a steering motor of the single winding type. In a case in which the operation states of the first steering controller 110 and the second steering controller 120 are normal, the steering motor can be controlled by providing a first assist current to one winding of the steering motor of the single winding type through the first steering controller 110. On the other hand, in a case in which the operation state of the first steering controller 110 is abnormal, and the operation state of the second steering controller 120 is normal, the control right of the first steering controller 110 is moved to the second steering controller 120, and the steering motor may be controlled by providing a second assist current to one winding of the steering motor of the single winding type through the second steering controller 120.

The power supply 300 may form a first output power source and a second output power source based on at least one input power source out of a first input power source and a second input power source through control of a power supply path.

In a case in which the operation states of the first steering controller 110 and the second steering controller 120 are normal, the power supply 300 forms a first output power source based on the first input power source through control of the power supply path and may provide the first output power source to the first steering controller 110. Likewise, in such a case, the power supply 300 may provide a second output power source for the second steering controller 120 based on the second input power source. However, the second steering controller 120 may not control the steering motor. In a case in which the operation state of the first steering controller 110 is abnormal, and the operation state of the second steering controller 120 is normal, the power supply 300 may provide a second output power source generated based on the second input power source for the second steering controller 120 through control of the power supply path. The second steering controller 120 may control the steering motor based on the second output power source.

Here, the first input power source may have a value larger than the second input power source. The power supply 300 may include a first DC power supply 312, a second DC power supply 313, and a first path controller 331 to a third path controller 333. A first node N1 may be positioned between the first path controller 331 and the second path controller 332. A negative terminal of the first DC power supply 312 and a positive terminal of the second DC power supply 313 are connected to each other, and a second node N2 may be positioned between the negative terminal of the first DC power supply 312 and the positive terminal of the second DC power supply 313.

The first path controller 331 may control a power supply path between the positive terminal of the first DC power supply 312 and the first node N1. The second path controller 332 may control a power supply path between the first node N1 and the first steering controller 110. The third path controller 333 may control a power supply path between the second node N2 and the second steering controller 120.

Here, the first input power source may be a power source of the positive terminal of the first DC power supply 312, and the second input power source may be a power source of the positive terminal of the second DC power supply 313.

As described above, in a case in which the operation states of the first steering controller 110 and the second steering controller 120 are normal, the power supply 300 may form a first output power based on the first input power source through the first path controller 331 and the second path controller 332 and provide the formed first output source for the first steering controller 110. The first steering controller 110 may control the steering motor based on the first output power source.

In addition, in a case in which the operation states of the first steering controller 110 and the second steering controller 120 are normal, the power supply 300 may form a second output power source based on the second input power source through the third path controller 333 and provide the second output power source for the second steering controller 120. The second steering controller 120 may not control the steering motor. On the other hand, in a case in which the operation state of the first steering controller 110 is abnormal, and the operation state of the second steering controller 120 is normal, the power supply 300 may form a second output power source based on the second input power source through the third path controller 333 and provide the formed second output power source for the second steering controller 120. The second steering controller 120 may control the steering motor based on the second output power source. Meanwhile, the first path controller 331 may include a first switch SW1 positioned on the power supply path between the positive terminal of the first DC power supply 312 and the first node N1.

The second path controller 332 may include a first diode D1 positioned on the power supply path between the first node N1 and the first steering controller 110.

The third path controller 333 may include a second diode D2 positioned on the power supply path between the second node N2 and the second steering controller 120.

In a case in which the operation states of the first steering controller 110 and the second steering controller 120 are normal, the first switch SW1 may be in the on state.

In other words, in a case in which the operation states of the first steering controller 110 and the second steering controller 120 are normal, the first switch SW1 may be in the on state, the first diode D1 may be in the on state, and the second diode D2 may be in the on state. Here, in a case in which the first DC power supply 312 supplies 12 V, and the second DC power supply 313 supplies 12 V, the first input power source may be 24 V. Thus, the first output power source that is formed by causing the first input power source to pass through the first diode D1 may be 24 V×Vfd of the first diode D1 (in other words, (the first DC power supply 312+the second DC power supply)×(Vfd of the first diode D1)). Here, Vfd of the first diode D1 may be 0.3 V to 0.7 V. In a case in which the second DC power supply 313 supplies 12 V, the second DC power supply 313 may be formed as the second output power source of 12V through the second diode D2. In a case in which the operation state of the first steering controller 110 is abnormal, and the operation state of the second steering controller 120 is normal, the first switch SW1 may be in the off state.

In other words, in a case in which the operation state of the first steering controller 110 is abnormal, and the operation state of the second steering controller 120 is normal, the first switch SW1 may be in the off state, the first diode D1 may be in the off state, and the second diode D2 may be in the on state. Through this, the second input power source may be formed as the second output power source through the second diode. Thus, the second steering controller 120 may control the steering motor based on the second output power source. The power supply 300 may further include a fourth path controller 334 and a fifth path controller 335. The fourth path controller 334 may control a power supply path between the positive terminal of the first DC power supply 312 and the first path controller 331. The fifth path controller 335 may control a power supply path between the positive terminal of the second DC power supply 313 and the second node N2.

Here, the fourth path controller 334 may include a first fuse 334-1 positioned on a power supply path between the positive terminal of the first DC power supply 312 and the first path controller 331.

The first fuse 334-1 may supply/block the first DC power source provided from the first DC power supply 312 to/from the first steering controller 110. In other words, in a case in which the first DC power source supplied from the first DC power supply 312 has a value that is equal to or larger than a value set in advance, the first fuse 334-1 may block the supply of the first DC power source to the first steering controller 110. The fifth path controller 335 may include a second fuse 335-1 positioned on a power supply path between the positive terminal of the second DC power supply 313 and the second node N2.

The second fuse 335-1 may supply/block the second DC power source provided from the second DC power supply 313 to/from the second steering controller 120. In other words, in a case in which the second DC power source supplied from the second DC power supply 313 has a value that is equal to or larger than a value set in advance, the second fuse 335-1 may block the supply of the second DC power source to the second steering controller 120.

As described above, according to the steering apparatus for a vehicle according to these embodiments, even if a malfunction occurs in a controller (in other words, a steering controller), the output is improved using a redundant system, and such a malfunction of the controller can be effectively handled.

Figure 22:
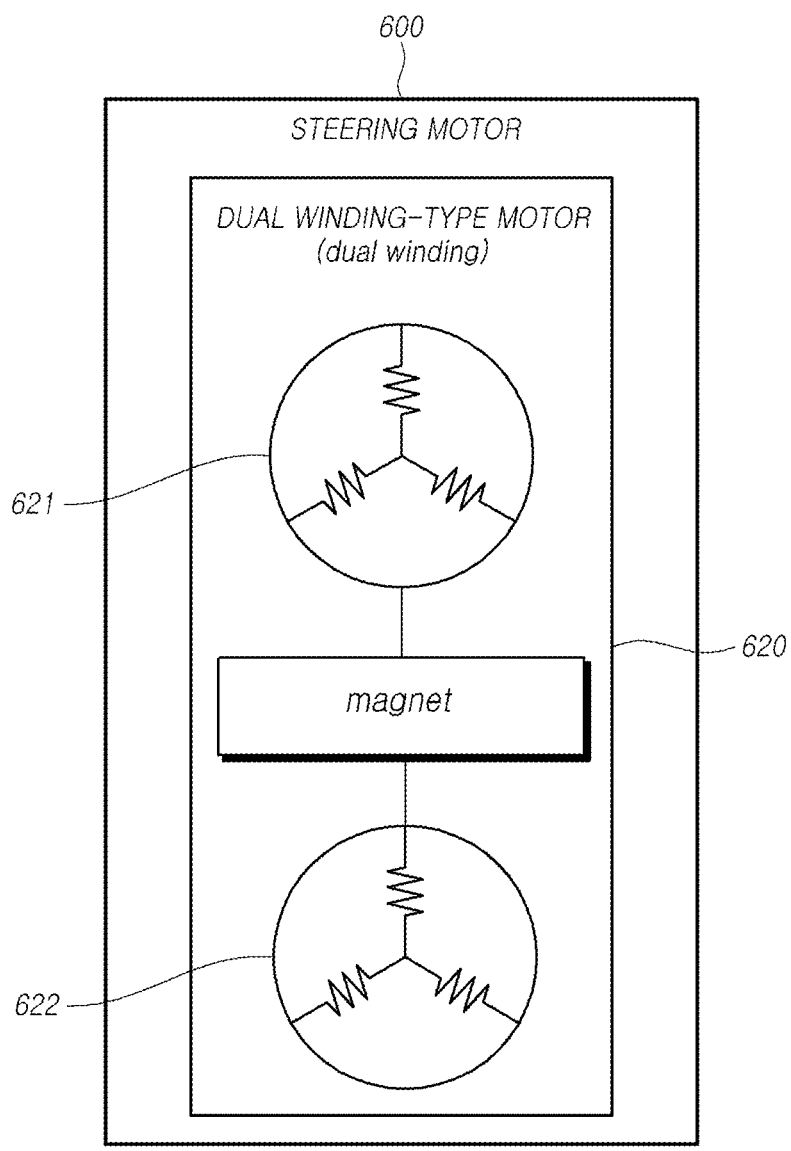
FIG. 22 is a specific diagram illustrating a steering motor according to these embodiments.

FIG. 22 is a specific diagram illustrating a steering motor according to these embodiments.

Referring to FIG. 22, the steering motor 600 according to these embodiments may include a dual winding-type motor 620. Particularly, the steering motor 600 may include a three-phase dual winding-type motor but is not limited thereto. Particularly, in the steering motor 620 of the dual winding type, at least one phase (for example, three phases, five phases, six phases, or the like) may be included in each of two windings 621 and 622. A first winding 621 is connected to the first steering controller 110, and an operation thereof may be controlled. A second winding 622 is connected to the second steering controller 120, and an operation thereof may be controlled.

Figure 23:
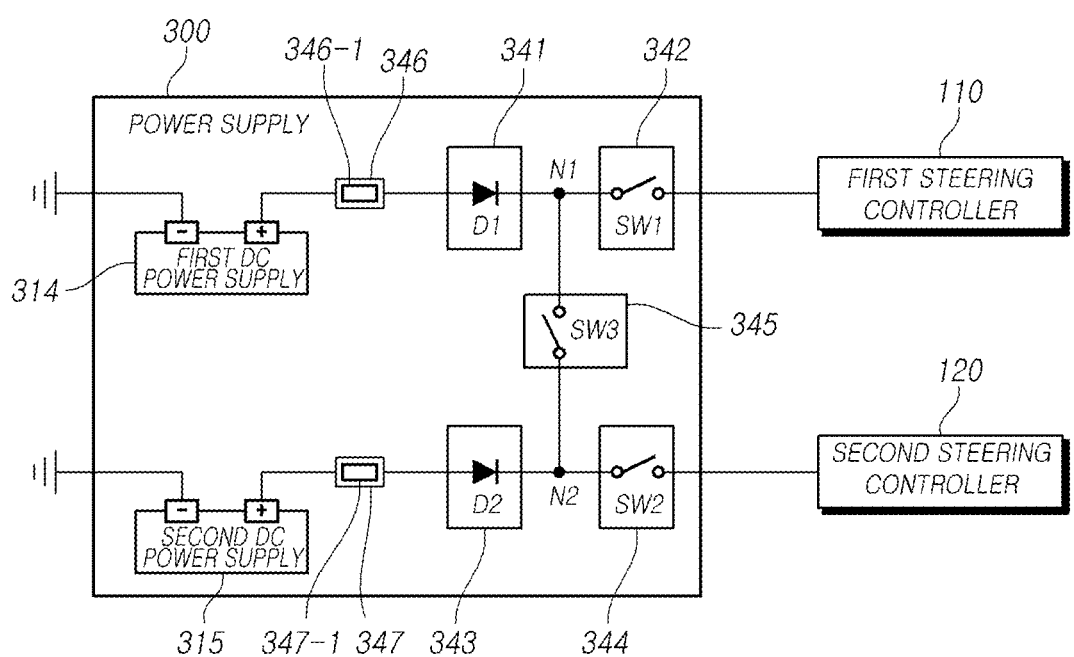
FIG. 23 is a specific diagram illustrating a power supply according to these embodiments.

FIG. 23 is a specific diagram illustrating a power supply according to these embodiments.

Referring to FIGS. 1 to 6, 8, 9, 20, 22, and 23, the first steering controller 110 and the second steering controller 120 may control a steering motor. The first steering controller 110 and the second steering controller 120 are connected to an internal communication network and may monitor mutual operation states. Here, it will be assumed in description that the steering motor 600 is a steering motor 620 of the dual winding type. In a case in which the operation states of the first steering controller 110 and the second steering controller 120 are normal, a first assist current is supplied to the first winding 621 of the steering motor 620 of the dual winding type through the first steering controller 110, a second assist current is supplied to the second winding 622 of the steering motor 620 of the dual winding type through the second steering controller 120, and the first steering controller 110 and the second steering controller 120 may control the steering motor 620 of the dual winding type together. For example, if the output of the steering motor 620 of the dual winding type is 100%, each of the first steering controller 110 and the second steering controller 120 may supply an assist current of 50% to a corresponding winding of the steering motor 620 of the dual winding type. In a case in which the operation state of the first steering controller 110 is abnormal, and the operation state of the second steering controller 120 is normal, a second assist current is supplied to the second winging 622 of the steering motor 620 of the dual winding type through the second steering controller 120, and accordingly, the steering motor 620 of the dual winding type may be controlled by only the second steering controller 120. In other words, the second steering controller 120 may generate a second assist current based on the second output power source and control the steering motor based on the second assist current. Particularly, the second assist current may be supplied to the second winding of the steering motor. The first steering controller 110 may not control the steering motor. In other words, the first steering controller 110 is in an abnormal state and thus may not control the steering motor.

Here, the second output power source in a case in which the operation state of the first steering controller 110 is abnormal, and the operation state of the second steering controller 120 is normal may have a value larger than the second output power source in a case in which the operation states of the first steering controller 110 and the second steering controller 120 are normal. Alternatively, the first input power source and the second input power source may have the same value.

The power supply 300 may include a first DC power supply 314, a second DC power supply 315, and a first path controller 341 to a fifth path controller 345.

A first node N1 may be positioned between the first path controller 341 and the second path controller 342, and a second node N2 may be positioned between the third path controller 343 and the fourth path controller 344.

The first path controller 341 may control a power supply path between the positive terminal of the first DC power supply 314 and the first node N1. The second path controller 342 may control a power supply path between the first node N1 and the first steering controller 110. The third path controller 343 may control a power supply path between the positive terminal of the second DC power supply 315 and the second node N2. The fourth path controller 344 may control a power supply path between the second node N2 and the second steering controller 120. The fifth path controller 345 may control a power supply path between the first node N1 and the second node N2.

Here, the first input power source is a power source of the positive terminal of the first DC power supply 314, and the second input power source may be a power source of the positive terminal of the second DC power supply 315.

Thus, in a case in which the operation state of the first steering controller 110 is abnormal, and the operation state of the second steering controller 120 are normal, the power supply 300 forms a second output power source based on the first input power source and the second input power source through the first path controller 341 and the third path controller 343 to the fifth path controller 345 and may supply the second output power source to the second steering controller 120. The second steering controller 120 may control the steering motor based on the second output power source. In a case in which the operation states of the first steering controller 110 and the second steering controller 120 are normal, the power supply 300 forms a first output power source based on the first input power source through the first path controller 341 and the second path controller 342 and may supply the first output power source to the first steering controller 110. The power supply 300 forms a second output power source based on the second input power source through the third path controller 343 and the fourth path controller 344 and may supply the second output power source to the second steering controller 120. The first steering controller 110 and the second steering controller 120 may control the steering motor together respectively based on the first output power source and the second power output source. Particularly, the first assist current may be supplied to the first winding of the steering motor, and the second assist current may be supplied to the second winding of the steering motor.

The first path controller 341 may include a first diode D1 positioned on a power supply path between the positive terminal of the first DC power supply 314 and the first node N1.

The second path controller 342 may include a first switch SW1 positioned on a power supply path between the first node N1 and the first steering controller 110. The third path controller 343 may include a second diode D2 positioned on a power supply path between the positive terminal of the second DC power supply 315 and the second node N2. The fourth path controller 344 may include a second switch SW2 positioned on a power supply path between the second node N2 and the second steering controller 120. The fifth path controller 345 may include a third switch SW3 positioned on a power supply path between the first node N1 and the second node N2.

In a case in which the operation state of the first steering controller 110 is abnormal, and the operation state of the second steering controller 120 is normal, the first switch SW1 may be in the off state, the second switch SW2 may be in the on state, and the third switch SW3 may be in the on state.

In other words, in a case in which the operation state of the first steering controller 110 is abnormal, and the operation state of the second steering controller 120 is normal, the first switch SW1 may be in the off state, the second switch SW2 may be in the on state, the third switch SW3 may be in the on state, the first diode D1 may be in the on state, and the second diode D2 may be in the on state. Through this, the first input power source may be supplied to the second node (N2) through the first diode D1 and the third switch SW3. The second input power source may be supplied to the second node N2 through the second diode D2. The input power source formed at the second node N2 may be formed as a second output power source through the second switch SW2. Thus, the second steering controller 120 may control the steering motor based on the second output power source. For example, in a case in which the first DC power supply 314 supplies 12 V, and the second DC power supply 315 supplies 12 V, in a case in which the operation state of the first steering controller 110 is abnormal, and the operation state of the second steering controller 120 is normal, the first DC power supply 314 that has passed through the first diode D1 and the second input power source that has passed through the second diode D2 may be formed as 12 V+αV through the second switch SW2.

In a case in which the operation states of the first steering controller 110 and the second steering controller 120 are normal, the first switch SW1 may be in the on state, the second switch SW2 may be in the on state, and the third switch SW3 may be in the off state.

In other words, in a case in which the operation states of the first steering controller 110 and the second steering controller 120 are normal, the second switch may be in the on state, the third switch SW3 may be in the off state, the first diode D1 may be in the on state, and the second diode D2 may be in the on state. Through this, the first input power source may be formed as a first output power source through the first diode D1 and the first switch SW1. The second input power source may be formed as a second output power source through the second diode D2 and the second switch SW2. The power supply 300 may further include a sixth path controller 346 and a seventh path controller 347. The sixth path controller 346 may control a power supply path between the positive terminal of the first DC power supply 314 and the first path controller 341. The seventh path controller 347 may control a power supply path between the positive terminal of the second DC power supply 315 and the third path controller 343. Here, the sixth path controller 346 may include a first fuse 346-1 positioned on a power supply path between the positive terminal of the first DC power supply 314 and the first path controller 341.

The first fuse 346-1 may supply/block the first DC power source provided from the first DC power supply 314 to/from the first steering controller 110. The seventh path controller 347 may include a second fuse 347-1 positioned on a power supply path between the positive terminal of the second DC power supply 315 and the third path controller 343. The second fuse 347-1 may supply/block the second DC power source provided from the second DC power supply 315 to/from the second steering controller 120. As described above, according to the steering apparatus for a vehicle according to these embodiments, even if a malfunction occurs in a controller (in other words, a steering controller), an output is improved in a redundant system, and such a malfunction of the controller can be effectively handled.

Figure 24:
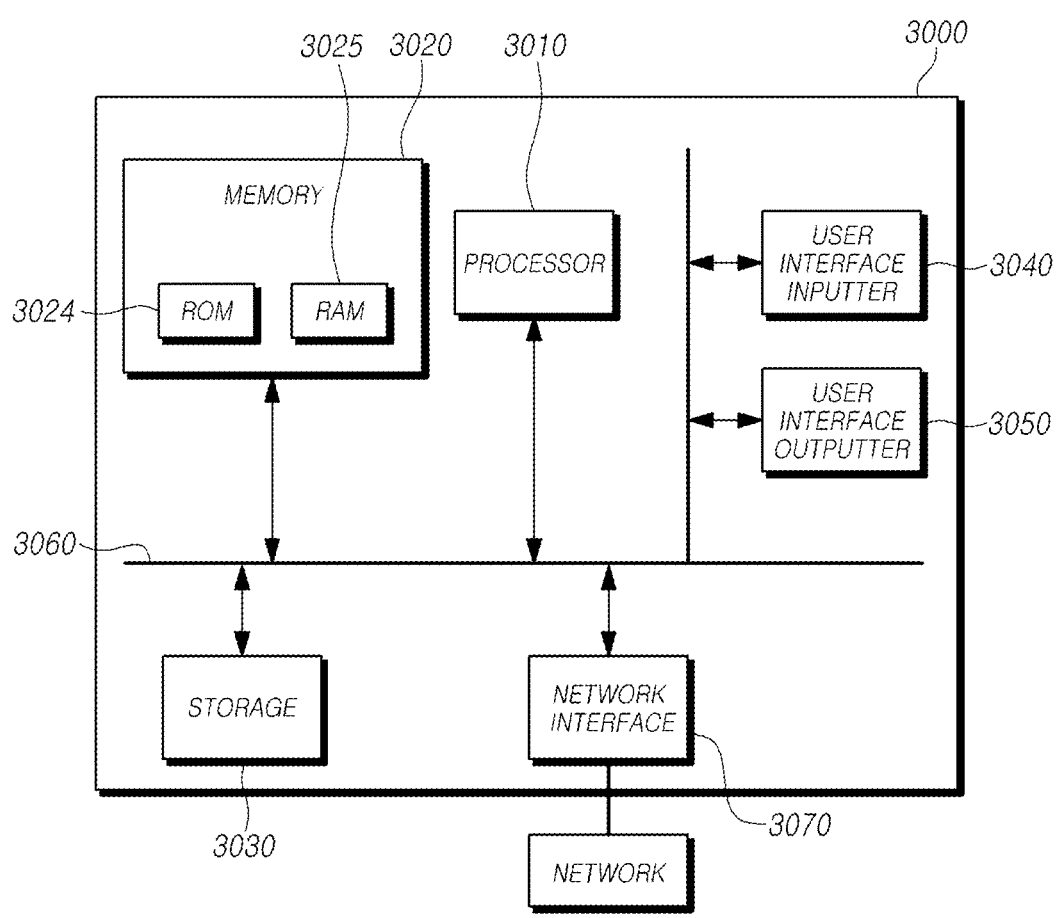
FIG. 24 is a block configuration diagram of a computer system of a steering apparatus for a vehicle according to these embodiments.

FIG. 24 is a block configuration diagram of a computer system of a steering apparatus for a vehicle according to these embodiments. Referring to FIG. 24, these embodiments described above, for example, may be embodied as a computer-readable recording medium within a computer system. As illustrated in the drawings, a computer system 3000 of a steering apparatus for a vehicle or the like may include at least one or more elements among one or more processors 3010, a memory 3020, a storage 3030, a user interface inputter 3040, and a user interface outputter 3050, and these elements may communicate with each other through a bus 3060. In addition, the computer system 3000 may include a network interface 3070 used for connection to a network. The processor 3010 may be a CPU or a semiconductor device that executes processing commands stored in the memory 3020 and/or the storage 3030. The memory 3020 and the storage 3030 may include various types of volatile/nonvolatile storage media. For example, the memory may include a ROM 3021 and a RAM 3023. In this way, these embodiments may be embodied as a method realized using a computer or a nonvolatile computer recording medium in which computer-executable commands are stored. The commands described above can perform a method according to at least one embodiment among these embodiments if executed by a processor.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

REFERENCE SIGNS LIST

100: steering controller
200: internal communication network
300: power supply
400: steering torque sensor
500: steering angle sensor
600: steering motor
700: external communication network

What is claimed is:

1. A steering apparatus for a vehicle comprising:
a first steering controller and a second steering controller configured to control a steering motor; and
a power supply configured to form a first output power source and a second output power source based on at least one of a first input power source or a second input power source through control of a power supply path,
wherein, in a case in which operation states of the first steering controller and the second steering controller are normal, the power supply forms a first output power source using the first input power source through control of the power supply path, and the first steering controller controls the steering motor based on the first output power source,
wherein the power supply includes a first DC power supply, a second DC power supply, and first to third path controllers,
wherein a first node is connected between the first path controller and the second path controller, a negative terminal of the first DC power supply and a positive terminal of the second DC power supply are connected to each other, and a second node is connected between the negative terminal of the first DC power supply and the positive terminal of the second DC power supply, and
wherein the first path controller controls a power supply path between a positive terminal of the first DC power supply and the first node, the second path controller controls a power supply path between the first node and the first steering controller, and the third path controller controls a power supply path between the second node and the second steering controller.

2. The steering apparatus for a vehicle according to claim 1,
wherein, in a case in which the operation state of the first steering controller is abnormal, and the operation state of the second steering controller is normal, the power supply forms a second output power source based on the second input power source through the control of the power supply path, and the second steering controller controls the steering motor based on the second output power source.

3. The steering apparatus for a vehicle according to claim 1,
wherein the first input power source has a value larger than the second input power source.

4. The steering apparatus for a vehicle according to claim 1,
wherein the first input power source is a power source of the positive terminal of the first DC power supply, and the second input power source is a power source of the positive terminal of the second DC power supply.

5. The steering apparatus for a vehicle according to claim 4,
wherein, in a case in which the operation states of the first steering controller and the second steering controller are normal, the power supply forms a first output power source based on the first input power source through the first path controller and the second path controller, and the first steering controller controls the steering motor based on the first output power source.

6. The steering apparatus for a vehicle according to claim 4,
wherein, in a case in which the operation state of the first steering controller is abnormal, and the operation state of the second steering controller is normal, the power supply forms a second output power source based on the second input power source through the third path controller, and the second steering controller controls the steering motor based on the second output power source.

7. The steering apparatus for a vehicle according to claim 4,
wherein the first path controller includes a first switch positioned on a power supply path between the positive terminal of the first DC power supply and the first node,
wherein the second path controller includes a first diode positioned on a power supply path between the first node and the first steering controller, and
wherein the third path controller includes a second diode positioned on a power supply path between the second node and the second steering controller.

8. The steering apparatus for a vehicle according to claim 7,
wherein, in a case in which the operation states of the first steering controller and the second steering controller are normal, the first switch is in an on state.

9. The steering apparatus for a vehicle according to claim 7,
wherein, in a case in which the operation state of the first steering controller is abnormal, and the operation state of the second steering controller is normal, the first switch is in an off state.

10. The steering apparatus for a vehicle according to claim 1,
wherein the steering motor includes a steering motor of a single winding type.

11. A steering apparatus for a vehicle comprising:
a first steering controller and a second steering controller that-configured to control a steering motor; and
a power supply configured to form a first output power source and a second output power source based on at least one of a first input power source or a second input power source through control of a power supply path,
wherein, in a case in which an operation state of the first steering controller is abnormal, and an operation state of the second steering controller is normal, the power supply forms a second output power source based on the first input power source and the second input power source through control of the power supply path, and the second steering controller controls the steering motor based on the second output power source,
wherein the power supply includes a first DC power supply, a second DC power supply and first to fifth path controllers,
wherein a first node is positioned between the first path controller and the second path controller, and a second node is positioned between the third path controller and the fourth path controller, and
wherein the first path controller controls a power supply path between a positive terminal of the first DC power supply and the first node, the second path controller controls a power supply path between the first node and the first steering controller, the third path controller controls a power supply path between a positive terminal of the second DC power supply and the second node, the fourth path controller controls a power supply path between the second node and the second steering controller, and the fifth path controller comprising the first switch controls a power supply path between the first node and the second node.

12. The steering apparatus for a vehicle according to claim 11,
wherein, in a case in which the operation states of the first steering controller and the second steering controller are normal, the power supply forms a first output power source based on the first input power source through the control of the power supply path and forms a second output power source based on the second input power source, and the first steering controller and the second steering controller controls the steering motor respectively based on the first output power source and the second output power source.

13. The steering apparatus for a vehicle according to claim 11, wherein the first input power source and the second input power source have the same value.

14. The steering apparatus for a vehicle according to claim 11,
wherein the first input power source is a power source of the positive terminal of the first DC power supply, and the second input power source is a power source of the positive terminal of the second DC power supply.

15. The steering apparatus for a vehicle according to claim 14,
wherein, in a case in which the operation state of the first steering controller is abnormal, and the operation state of the second steering controller is normal, the power supply forms a second output power source based on the first input power source and the second input power source through the first path controller and the third to fifth path controllers, and the second steering controller controls the steering motor based on the second output power source.

16. The steering apparatus for a vehicle according to claim 14,
wherein, in a case in which the operation states of the first steering controller and the second steering controller are normal, the power supply forms a first output power source based on the first input power source through the first path controller and the second path controller and forms a second output power source based on the second input power source through the third path controller and the fourth path controller, and the first steering controller and the second steering controller control the steering motor respectively based on the first output power source and the second output power source.

17. The steering apparatus for a vehicle according to claim 14,
wherein the first path controller includes a first diode positioned on a power supply path between the positive terminal of the first DC power supply and the first node,
wherein the second path controller includes a second switch positioned on a power supply path between the first node and the first steering controller,
wherein the third path controller includes a second diode positioned on a power supply path between the positive terminal of the second DC power supply and the second node,
wherein the fourth path controller includes a third switch positioned on a power supply path between the second node and the second steering controller, and
wherein the fifth path controller includes the first switch positioned on a power supply path between the first node and the second node.

18. The steering apparatus for a vehicle according to claim 17,
wherein, in a case in which the operation state of the first steering controller is abnormal, and the operation state of the second steering controller is normal, the second switch is in an off state, the second switch is in an on state, and the first switch is in the on state.

19. The steering apparatus for a vehicle according to claim 17,
wherein, in a case in which the operation states of the first steering controller and the second steering controller are normal, the second switch is in an on state, the third switch is in the on state, and the first switch is in an off state.

20. The steering apparatus for a vehicle according to claim 11,
wherein the steering motor includes a steering motor of a dual winding type.

* * * * *